(12) United States Patent
Ishida et al.

(10) Patent No.: US 9,058,647 B2
(45) Date of Patent: Jun. 16, 2015

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Takuya Ishida, Tokyo (JP); Kiyohide Satoh, Kawasaki (JP); Takaaki Endo, Urayasu (JP); Ryo Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 13/741,665

(22) Filed: Jan. 15, 2013

(65) Prior Publication Data
US 2013/0182901 A1 Jul. 18, 2013

(30) Foreign Application Priority Data

Jan. 16, 2012 (JP) .................................. 2012-006394
Feb. 24, 2012 (JP) .................................. 2012-038719

(51) Int. Cl.
G06T 7/00 (2006.01)
G06T 11/00 (2006.01)
G06T 3/00 (2006.01)
A61B 5/00 (2006.01)
A61B 5/103 (2006.01)
(Continued)

(52) U.S. Cl.
CPC .............. G06T 7/0012 (2013.01); G06T 7/0032 (2013.01); *G06T 2207/10072* (2013.01); *G06T 2207/10132* (2013.01); *G06T 2207/30004* (2013.01)

(58) Field of Classification Search
CPC ... G06T 7/0012; G06T 7/0024; G06T 7/0032; G06T 2207/10072; G06T 2207/10084; G06T 2007/10132; G06T 2207/30096; G06T 11/003; G06T 3/0068; A61B 5/0035; A61B 5/103; A61B 5/1107; A61B 6/5223; A61B 6/5229; A61B 6/5235; A61B 6/5247
USPC ........... 382/131, 128, 132, 285; 600/421, 437
See application file for complete search history.

(56) References Cited

U.S. PATENT DOCUMENTS

2006/0036162 A1* 2/2006 Shahidi et al. ................. 600/424
2006/0079771 A1* 4/2006 Nir ................................ 600/437
(Continued)

FOREIGN PATENT DOCUMENTS

CN 1805711 A 7/2006
CN 101859441 A 10/2010
(Continued)

OTHER PUBLICATIONS

Xu, et al. "Real-time MRI-TRUS Fusion for Guidance of Targeted Prostate Biopsies." Comput Aided Surg. 13.5 (2008): 255-64.*
(Continued)

*Primary Examiner* — Michael A Newman
(74) *Attorney, Agent, or Firm* — Canon USA Inc. IP Division

(57) ABSTRACT

An information processing apparatus includes a region acquisition unit configured to obtain a specific region of a subject, a tomographic image acquisition unit configured to obtain a tomographic image of the subject, and a display control unit configured to cause a display unit to display a region indicating probability of existence of the specific region in the obtained tomographic image.

21 Claims, 17 Drawing Sheets

(51) Int. Cl.
*A61B 5/11* (2006.01)
*A61B 6/00* (2006.01)

(56) References Cited

U.S. PATENT DOCUMENTS

| | | | |
|---|---|---|---|
| 2008/0039723 A1* | 2/2008 | Suri et al. | 600/437 |
| 2008/0123927 A1* | 5/2008 | Miga et al. | 382/131 |
| 2008/0143724 A1 | 6/2008 | Russakoff | |
| 2008/0170770 A1* | 7/2008 | Suri et al. | 382/128 |
| 2008/0247616 A1* | 10/2008 | Pescatore et al. | 382/128 |
| 2009/0052757 A1* | 2/2009 | Khamene et al. | 382/131 |
| 2009/0129650 A1* | 5/2009 | Hawkes et al. | 382/131 |
| 2010/0016710 A1* | 1/2010 | Kumar et al. | 600/425 |
| 2010/0239150 A1* | 9/2010 | Ishikawa et al. | 382/131 |
| 2012/0287131 A1* | 11/2012 | Matsuzaki et al. | 345/426 |

FOREIGN PATENT DOCUMENTS

| | | | |
|---|---|---|---|
| CN | 102247166 A | | 11/2011 |
| JP | 2003-260056 A | | 9/2003 |
| JP | 2008212680 A | | 9/2008 |
| JP | 2008246264 A | | 10/2008 |

OTHER PUBLICATIONS

Fei, et al. "A PET/CT Directed, 3D Ultrasound-Guided Biopsy System for Prostate Cancer." Prostate Cancer Imaging 2011, LCNS 6963 (2011): 100-08.*
Porter, et al. "Three-Dimensional Registration and Fusion of Ultrasound and MRI Using Major Vessels as Fiducial Markers." IEEE Transactions on Medical Imaging 20.4 (2001): 354-59.*
Kessler, et al. "Image Fusion for Conformal Radiation Therapy." 3D Conformal Radiation Therapy and Intensity Modulation Radiation Therapy: Physics and Clinical Considerations. (2001): 1-12.*
Collignon, et al. "Automated multi-modality image registration based on information theory." In: Bizais. (1995): 1-12.*
Hu et al., "A Statistical motion model based on biomechanical simulations for data fusion during image-guided prostate interventions," MICCAI 2008, Part I, LNCS 5241, pp. 737-744, 2008.

* cited by examiner

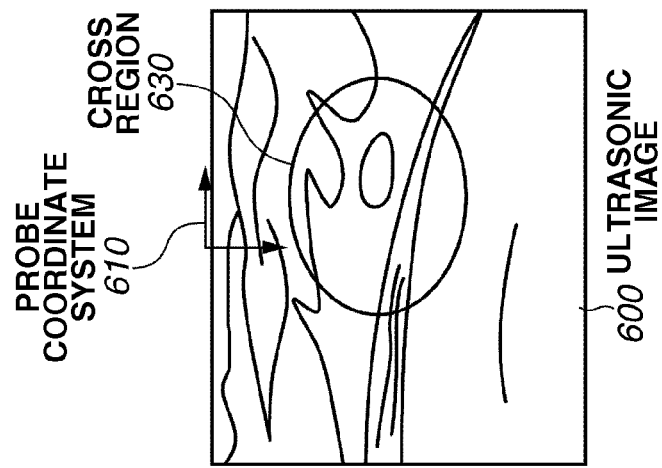
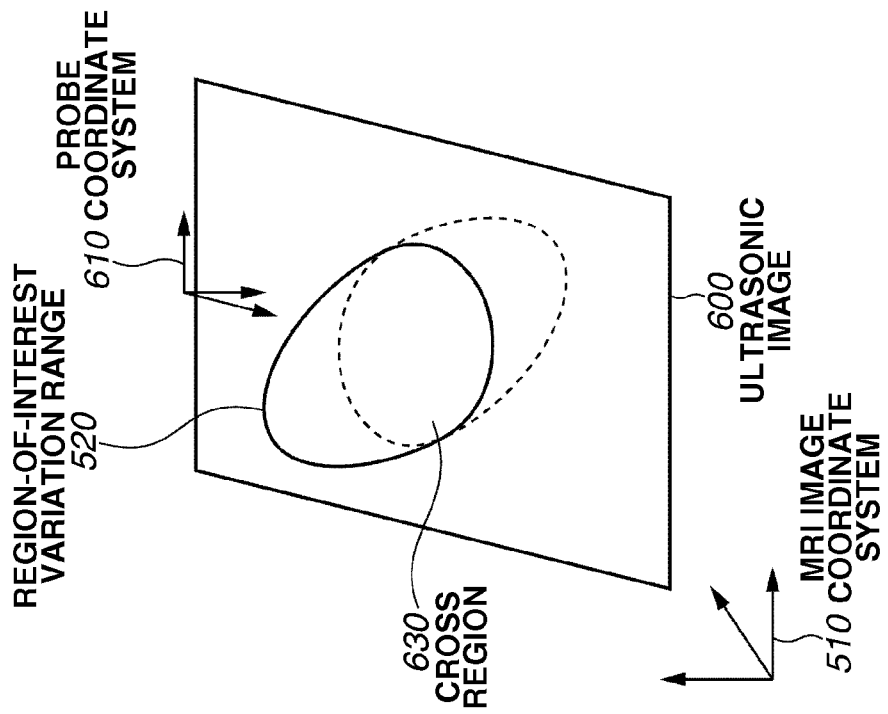

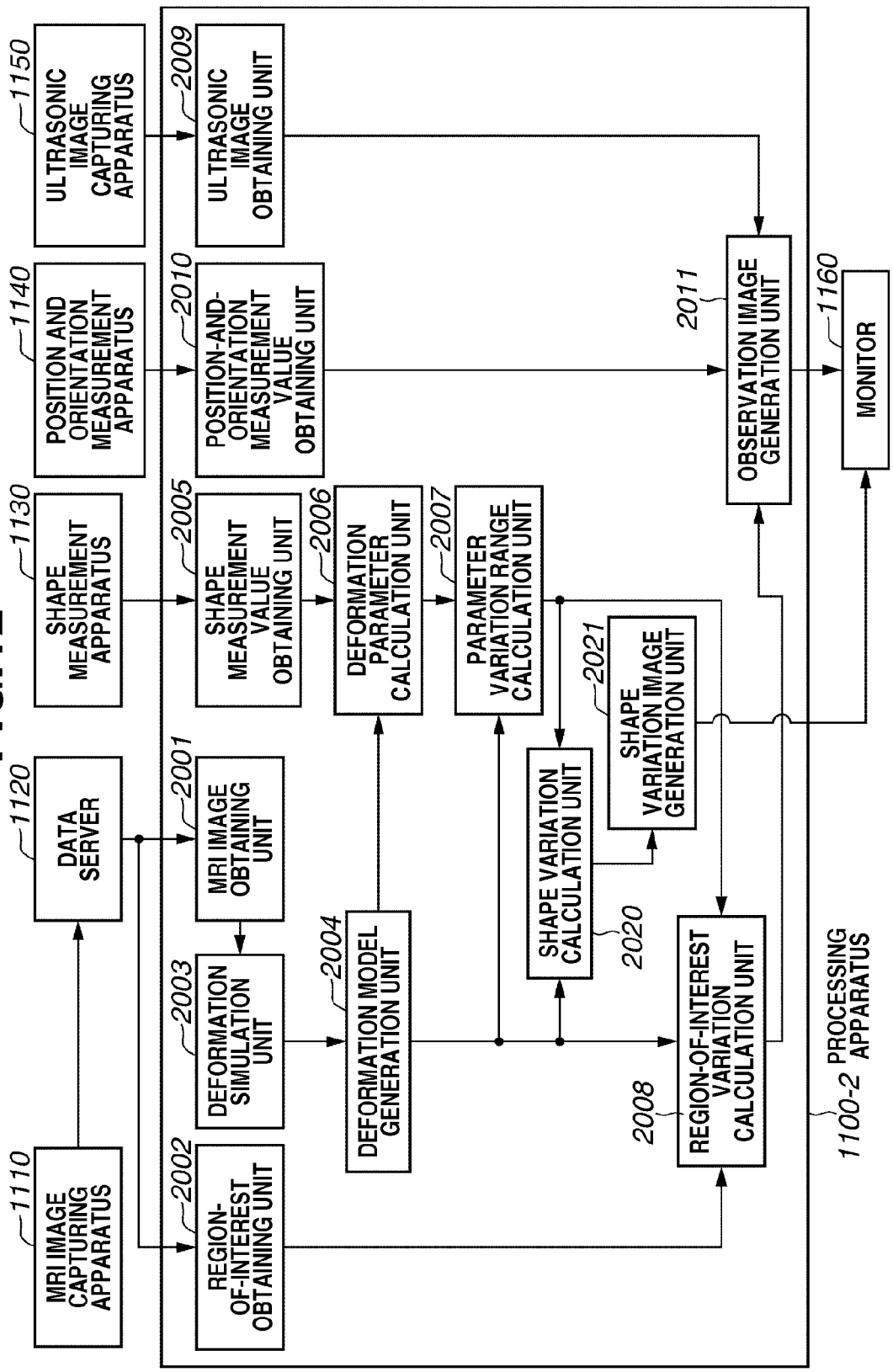

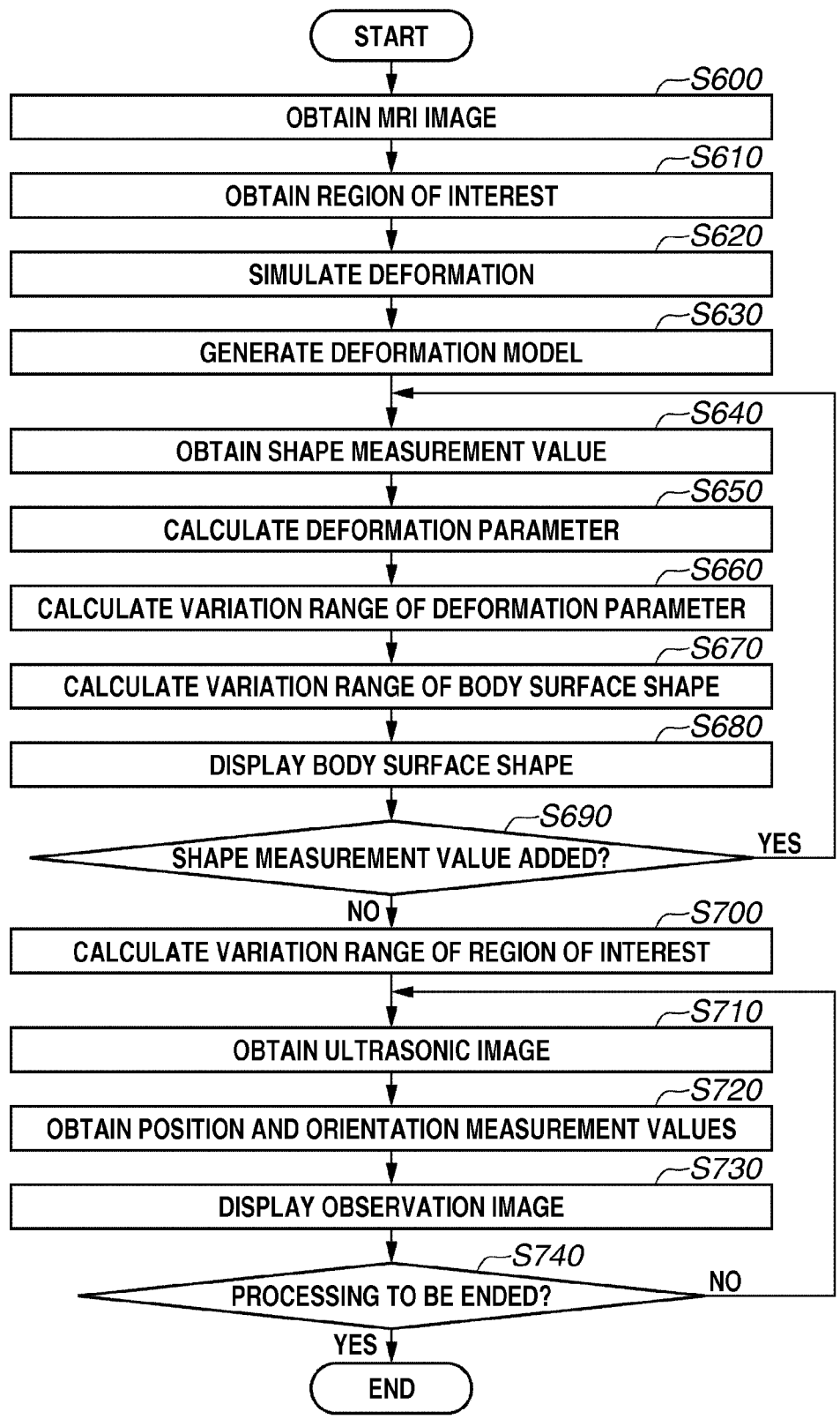

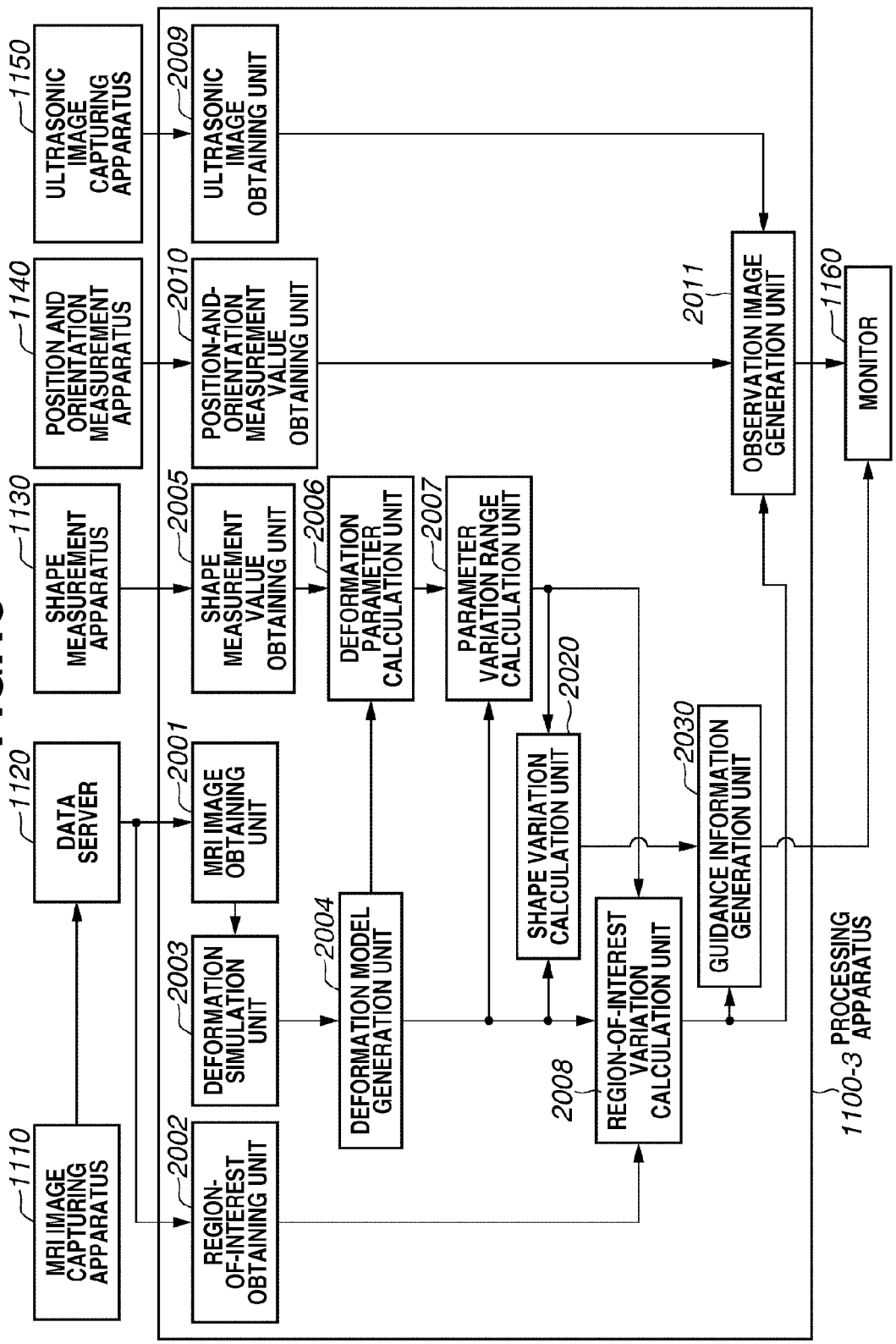

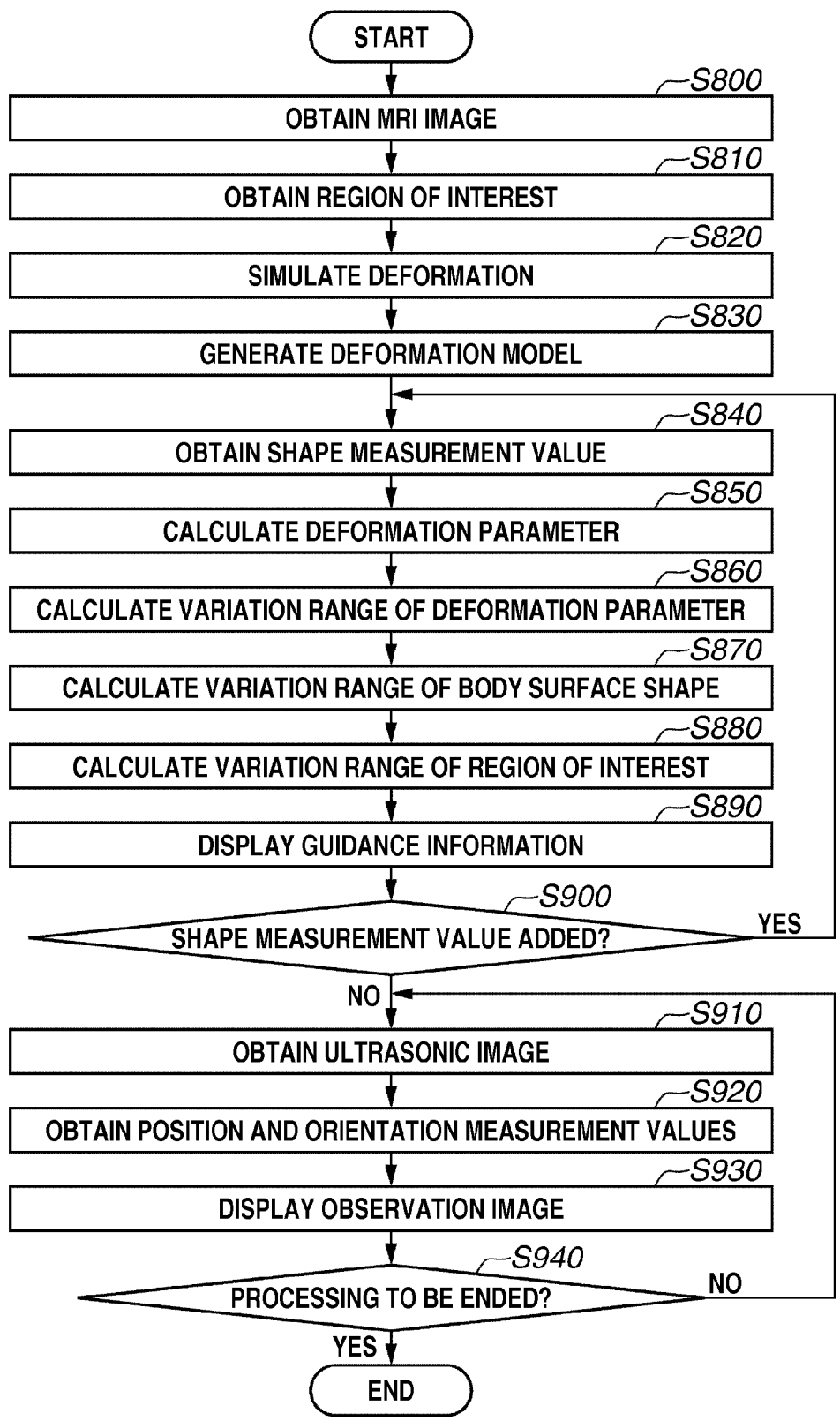

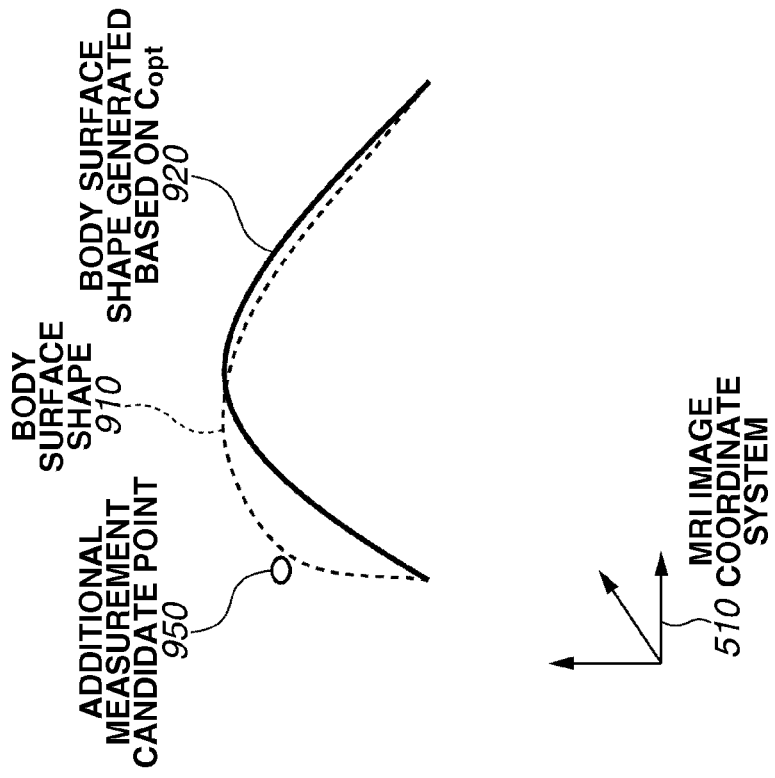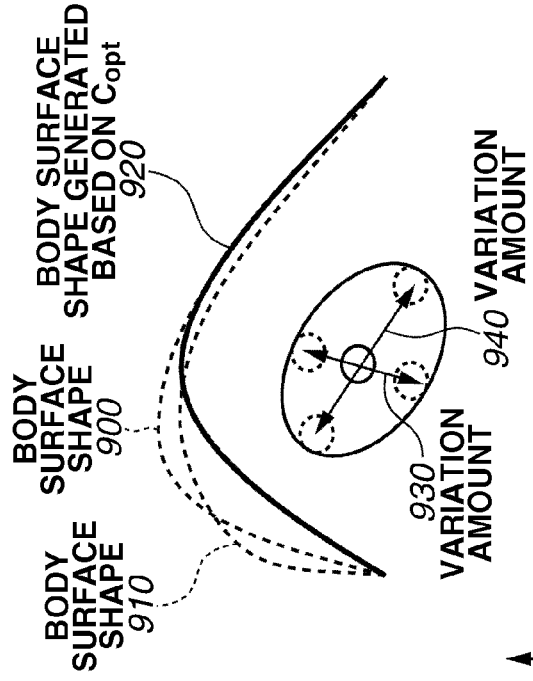

INFORMATION PROCESSING APPARATUS, INFORMATION PROCESSING METHOD, AND STORAGE MEDIUM

BACKGROUND OF THE INVENTION

1. Field of the Invention

The present invention relates to an image processing apparatus, an image processing method, and a storage medium storing program that causes a computer to execute the image processing method.

2. Description of the Related Art

In the medical field, a physician displays a medical image including a captured subject (e.g., a three-dimensional image composed of a tomographic image group that represents three-dimensional internal information of the subject) on a monitor, and diagnoses a lesion while reading the displayed medical image. A medical image collection apparatus that can capture a group of tomographic images is generally referred to as a "modality." For example, representative modalities include an ultrasonic image diagnosing apparatus (e.g., an ultrasonic image capturing apparatus), a magnetic resonance imaging apparatus (hereinafter, referred to as "MRI apparatus"), and an X-ray computer tomographic imaging apparatus (hereinafter, referred to as "X-ray CT apparatus").

It is generally difficult for a physician to accurately diagnose the state of a lesion while observing a group of tomographic images captured by these modalities. Hence, performing a comparison with respect to a concerned lesion between tomographic image groups captured by different modalities (or differentiated in captured date and time) has been conventionally tried to improve the accuracy in the diagnosis of the lesion state.

To utilize a plurality of types of tomographic image groups in a diagnostic operation, it is important to perform matching between respective tomographic image groups with respect to a lesion of interest. It is generally difficult to realize an automatic matching based on image processing due to various influences (including differences in respective modalities and deformation of the subject). Therefore, an operator (e.g., a physician) generally performs a manual matching work while viewing corresponding images. In this case, while viewing a lesion of interest indicated in one image group, the operator identifies a portion corresponding to the lesion (i.e., a corresponding lesion) in the other image group with reference to the similarity in the shape of the lesion or its peripheral portion. Trials to support the above-described matching work have been conventionally conducted.

For example, as discussed in Japanese Patent Application Laid-Open No. 2008-246264, it is conventionally feasible to support the search of a corresponding lesion on an ultrasonic tomographic image by displaying (or superimposing), on the ultrasonic tomographic image, information relating to the position of a lesion indicated on a three-dimensional image (for example, captured by the X-ray CT apparatus). More specifically, the processing discussed in Japanese Patent Application Laid-Open No. 2008-246264 includes obtaining the position of the ultrasonic tomographic image in the three-dimensional image space by performing positioning of the ultrasonic tomographic image relative to the three-dimensional image and drawing a boundary line, when the lesion of interest intersects with the ultrasonic cross section, on the ultrasonic tomographic image. In this case, a user can easily search for the corresponding lesion on the ultrasonic tomographic image that corresponds to the lesion of interest.

Further, as discussed in Japanese Patent Application Laid-Open No. 2008-212680, it is conventionally feasible to draw information representing the distance between a lesion of interest and an ultrasonic tomographic image, on the ultrasonic tomographic image, after completing the positioning of the ultrasonic tomographic image relative to a three-dimensional image.

However, in a case where an ultrasonic probe is used in the measurement of the position and orientation, a measurement value includes a significant error due to the accuracy of each probe. Further, the shape of a subject may vary due to the time difference between capturing of a reference image and capturing of an ultrasonic tomographic image. Therefore, a significant error is included in the estimated position of a corresponding lesion in a coordinate system that defines the ultrasonic tomographic image. In other words, the estimated position of the corresponding lesion tends to deviate from the actual position of the corresponding lesion. However, the above-described positional deviation is not taken into consideration in the conventional display discussed in Japanese Patent Application Laid-Open No. 2008-246264 or Japanese Patent Application Laid-Open No. 2008-212680. Accordingly, a user cannot identify (or cannot find) the corresponding lesion if the above-described positional deviation becomes larger. In this case, the user is forced to search the entire ultrasonic tomographic image to identify the corresponding lesion. As a result, the search efficiency decreases.

In a case where the conventional technique discussed in Japanese Patent Application Laid-Open No. 2008-246264 is employed, if the positioning of the ultrasonic tomographic image relative to the three-dimensional image has been performed without any error (i.e., in an ideal environment), the corresponding lesion exists in the drawn region. However, the actual positioning includes an error. Therefore, the corresponding lesion may exist in the vicinity of the drawn region. Hence, it is necessary for the operator to visually find the corresponding lesion in a relatively wide region including the drawn region and its vicinity. In this case, determining the search range appropriately considering the error is not so easy for the operator if the experience of the operator itself is insufficient.

Further, in a case where the conventional technique discussed in Japanese Patent Application Laid-Open No. 2008-212680 is employed, although it is possible for the operator to check the distance between the present cross section and the position of the corresponding lesion, determining the search range appropriately considering the error is not so easy for the operator if the experience of the operator itself is insufficient.

SUMMARY OF THE INVENTION

The inventors of the present invention have thought up an idea (i.e., a novel technique) capable of solving the above-described problems, as a result of enthusiastic studies having been conducted. The technique proposed by the inventors includes calculating a range in which a corresponding lesion possibly exists (hereinafter, referred to as an "existence range") on an ultrasonic tomographic image while taking a positional estimation error into consideration. Further, the technique proposed by the inventors includes adding the existence range on the ultrasonic tomographic image, as a guidance in a case where a user searches for the corresponding lesion. Thus, the user can easily recognize an appropriate search range for the corresponding lesion and can efficiently identify the corresponding lesion.

However, according to the above-described technique, the display of the existence range is effective only for a limited error. The possibility that the corresponding lesion may exist outside the range is not taken into consideration. Therefore, if an actual error exceeds a level having been estimated beforehand by the apparatus, the displayed existence range may prevent a user from finding the corresponding lesion that exists outside the range. If a sufficiently large estimation error is set beforehand, it will be feasible to reduce the risk that the actual error exceeds the estimated level of the apparatus. However, in this case, the user is required to perform a useless search. The efficiency of the search sufficiently cannot be increased.

The present invention is directed to an information processing apparatus and an information processing method, which can easily identify a search target region.

Further, in performing the matching between a first image and a second image captured by different modalities, the present invention is directed to a method for presenting, in the second image, an existence range of a portion corresponding to a region of interest in the first image.

According to an aspect of the present invention, an information processing apparatus includes a region acquisition unit configured to obtain a specific region of a subject, a tomographic image acquisition unit configured to obtain a tomographic image of the subject, and a display control unit configured to cause a display unit to display a region indicating probability of existence of the specific region in the obtained tomographic image.

According to another aspect of the present invention, an information processing method includes obtaining a specific region of a subject, obtaining a tomographic image of the subject, and causing a display unit to display a region indicating probability of existence of the specific region in the obtained tomographic image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 11A and 11B schematically illustrate example processing to be performed in step S400 illustrated in FIG. 9, according to the fourth exemplary embodiment.

FIG. 12 schematically illustrates an example of a functional configuration of a processing system according to a fifth exemplary embodiment.

FIG. 13 is a flowchart illustrating an example procedure of processing that can be performed by a processing apparatus according to the fifth exemplary embodiment.

FIG. 15 schematically illustrates an example of a functional configuration of a processing system according to a sixth exemplary embodiment.

FIG. 16 is a flowchart illustrating an example procedure of processing that can be performed by a processing apparatus according to the sixth exemplary embodiment.

FIGS. 17A and 17B schematically illustrate example processing to be performed in step S890 illustrated in FIG. 16, according to the sixth exemplary embodiment.

DESCRIPTION OF THE EMBODIMENTS

Various exemplary embodiments, features, and aspects of the invention will be described in detail below with reference to the drawings.

An information processing system according to a first exemplary embodiment can display a superimposed image of an "existence probability distribution", which is a distribution indicating the existence probability of a region that corresponds to a region of interest in a reference image (e.g., three-dimensional image data), on a target image (such as a ultrasonic tomographic image captured in real time). In a case where the region of interest is a lesion of interest, a region that corresponds to the region of interest is a corresponding lesion. In other words, the information processing system according to the first exemplary embodiment enables an operator (e.g., a physician or an engineer) to easily identify a corresponding region included in the ultrasonic tomographic image.

Figure 1:
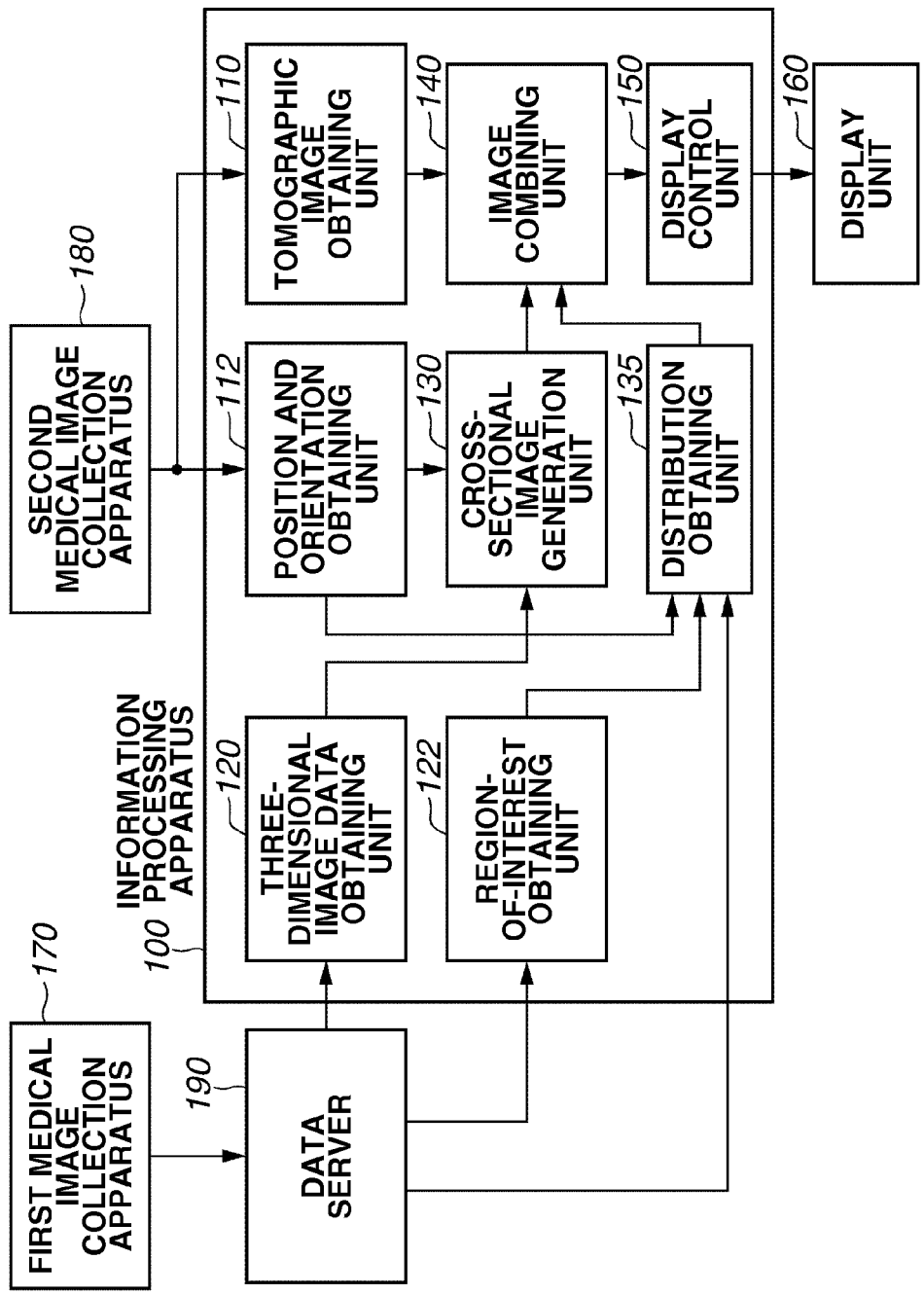
FIG. 1 illustrates a device configuration of an information processing system according to a first exemplary embodiment.

FIG. 1 illustrates an example configuration of the information processing system according to the first exemplary embodiment. As illustrated in FIG. 1, an information processing apparatus 100 according to the present exemplary embodiment includes a tomographic image acquisition unit 110, a position and orientation acquisition unit 112, a three-dimensional image data acquisition unit 120, a region-of-interest acquisition unit 122, a cross-sectional image generation unit 130, a distribution acquisition unit 135, an image combining unit 140, and a display control unit 150. The information processing apparatus 100 is connected to a data server 190 and a second medical image collection apparatus 180. The data server 190 stores three-dimensional image data and error factor information (as described below). The second medical image collection apparatus 180 is an ultrasonic imaging apparatus, an example of a diagnostic imaging apparatus, which can capture an ultrasonic tomographic image of a target subject.

Next, an example operation of the information processing apparatus 100 is described below.

The data server 190 can store three-dimensional image data of a subject, which has been obtained by a first medical image collection apparatus 170 beforehand. In the following description, the first medical image collection apparatus 170 is an MRI apparatus although the first medical image collection apparatus 170 can be an X-ray CT apparatus. In the present exemplary embodiment, it is presumed that the three-dimensional image data is expressed as three-dimensional volume data that indicates a luminance value (intensity value) in a three-dimensional voxel. Further, it is presumed that coordinate values of each voxel are defined using a coordinate system of the MRI apparatus. The three-dimensional image data stored in the data server 190 can be obtained from the three-dimensional image data acquisition unit 120 and input to the information processing apparatus 100.

Further, the data server 190 can store information that represents a region of interest in the three-dimensional image data. The information representing the region of interest is described in detail below. The information representing the region of interest stored in the data server 190 can be obtained from the region-of-interest acquisition unit 122 and input to the information processing apparatus 100. In the following description, it is presumed that the information representing the region of interest is defined using the coordinate system of the MRI apparatus, similar to three-dimensional image data. Further, the data server 190 can store information that is required to calculate the existence probability distribution of a corresponding region. The information that is required to calculate the existence probability distribution of the corresponding region is error factor information, as described in detail below. The error factor information stored in the data server 190 can be input to the information processing apparatus 100 via the distribution acquisition unit 135.

The second medical image collection apparatus 180 (e.g., the ultrasonic image diagnosing apparatus) can capture an ultrasonic tomographic image of the subject in real time. The ultrasonic tomographic image can be obtained by the tomographic image acquisition unit 110 and can be successively input to the information processing apparatus 100. Further, the position and orientation of an ultrasonic probe can be measured by a position and orientation sensor (not illustrated). The data measured by the sensor can be obtained by the position and orientation acquisition unit 112 and can be input to the information processing apparatus 100. In the present exemplary embodiment, the position and orientation of the ultrasonic probe is expressed, for example, using a reference coordinate system that is defined based on the subject. Further, the position and orientation acquisition unit 112 can obtain information indicating the position and orientation of the ultrasonic probe in the reference coordinate system and can calculate the position and orientation of the ultrasonic tomographic image in the coordinate system of the MRI apparatus based on the obtained position and orientation information.

The distribution acquisition unit 135 can estimate a region that corresponds to the region of interest (i.e., the corresponding region) in an ultrasonic coordinate system, based on the information representing the region of interest obtained by the region-of-interest acquisition unit 122 and the position and orientation of the ultrasonic tomographic image obtained by the position and orientation acquisition unit 112. In the present exemplary embodiment, the ultrasonic coordinate system is a three-dimensional coordinate system defined based on the ultrasonic tomographic image. For example, the ultrasonic coordinate system can be set to have an origin on the tomographic image, x and y axes that are perpendicular to each other and extend from the origin along a tomographic image plane, and a z axis extending in a direction perpendicular to the image plane. Further, the distribution acquisition unit 135 can calculate the existence probability distribution of the corresponding region on the ultrasonic tomographic image based on the estimated corresponding region and the error factor information obtained from the data server 190.

The cross-sectional image generation unit 130 can input three-dimensional volume data (which can be output from the three-dimensional image data acquisition unit 120) and information representing the position and orientation of the ultrasonic tomographic image (which can be output from the position and orientation acquisition unit 112). Further, the cross-sectional image generation unit 130 can generate a cross-sectional image that corresponds to the ultrasonic tomographic image, based on these data, with reference to the three-dimensional volume data. Then, the cross-sectional image generation unit 130 can output the generated cross-sectional image to the image combining unit 140. The image combining unit 140 can obtain information indicating the existence probability distribution of the corresponding lesion from the distribution acquisition unit 135, and can draw (superimpose) the obtained information on the ultrasonic tomographic image obtained from the tomographic image acquisition unit 110. Further, the image combining unit 140 can generate a composite image by combining the drawn image with the cross-sectional image obtained from the cross-sectional image generation unit 130. For example, the drawn image can be positioned on the left (or right) side of the composite image and the cross-sectional image can be positioned on the other side of the composite image. Further, the image combining unit 140 can output the generated composite image to the display control unit 150 or to an external device. The display control unit 150 can obtain the composite image (i.e., the output of the image combining unit 140) and can display the composite image on the display unit 160.

As another exemplary embodiment, at least a part of the configuration illustrated in FIG. 1 (e.g., at least one of the tomographic image acquisition unit 110, the position and orientation acquisition unit 112, the three-dimensional image data acquisition unit 120, the region-of-interest acquisition unit 122, the cross-sectional image generation unit 130, the distribution acquisition unit 135, the image combining unit 140, and the display control unit 150) can be constituted as an independent device. Alternatively, to realize the function of the above-described units, it is useful to install a software program on a single computer or a computer group that includes a CPU capable of executing the installed program. In the present exemplary embodiment, it is presumed that each unit can be realized by software programs installed on the same computer.

Figure 2:
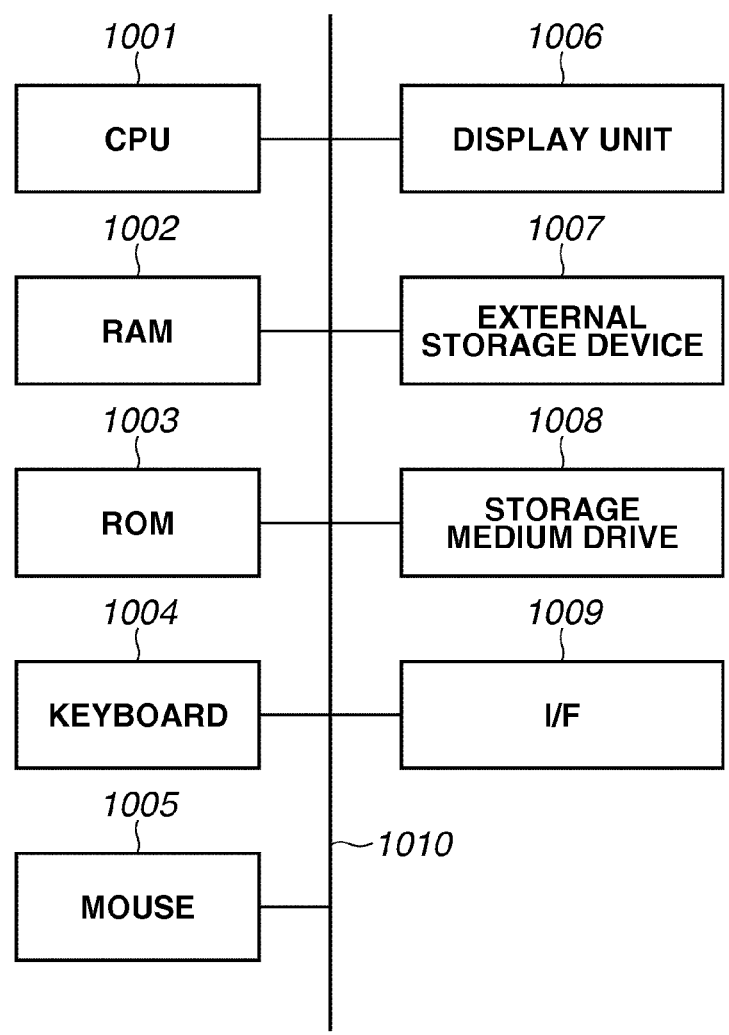
FIG. 2 illustrates a basic configuration of a computer.

FIG. 2 illustrates a basic configuration of a computer that can execute a software program to realize respective functions of the tomographic image acquisition unit 110, the position and orientation acquisition unit 112, the three-dimensional image data acquisition unit 120, the region-of-interest acquisition unit 122, the cross-sectional image generation unit 130, the distribution acquisition unit 135, the image combining unit 140, and the display control unit 150.

A central processing unit (CPU) 1001 can control various operations to be performed by the computer. To this end, the CPU 1001 can execute each program based on data that are stored in a random access memory (RAM) 1002 or a read only memory (ROM) 1003. Further, the CPU 1001 can control processing to be performed in the tomographic image acquisition unit 110, the position and orientation acquisition unit 112, the three-dimensional image data acquisition unit 120, the region-of-interest acquisition unit 122, the cross-sectional image generation unit 130, the distribution acquisition unit 135, the image combining unit 140, and the display control unit 150, to realize the functions of respective units.

The RAM 1002 includes a storage area that temporarily stores programs and data that have been loaded from an external storage device 1007 or a storage medium drive 1008. The RAM 1002 further includes a work area that can be used by the CPU 1001 to perform various processing.

In general, the ROM 1003 stores computer programs and setting data. A keyboard 1004 and a mouse 1005 are input devices, which enable an operator to input various instructions to the CPU 1001.

A display unit 1006 is, for example, constituted by a cathode ray tube (CRT) or a liquid crystal display device. The display unit 160 corresponds to the display unit 1006. The display unit 1006 can display a composite image, if it is generated by the image combining unit 140, and can display a message or a graphic user interface (GUI) to be displayed in image processing.

The external storage device 1007 is functionally operable as a mass information storage device, such as a hard disk drive, which can store an operating system (OS) and programs to be executed by the CPU 1001. Further, in the following description of the present exemplary embodiment, it is presumed that conventionally known information is stored in the external storage device 1007 and can be loaded into the RAM 1002, if necessary.

The storage medium drive 1008 can read a program or data from a storage medium (e.g., a Compact Disk Read Only Memory (CD-ROM) or a Digital Versatile Disk Read Only Memory (DVD-ROM)) according to an instruction from the CPU 1001. The storage medium drive 1008 can output the readout program or data to the RAM 1002 or the external storage device 1007.

An interface (I/F) 1009 can be constituted by an analog video port or a digital input/output port (e.g., IEEE1394) or an Ethernet (registered trademark) port that is configured to output a composite image or comparable information to an external device. Various data having been input via the I/F 1009 can be sent to the RAM 1002. The I/F 1009 can realize at least a part of the functions of the tomographic image acquisition unit 110, the position and orientation acquisition unit 112, the three-dimensional image data acquisition unit 120, the region-of-interest acquisition unit 122, and the distribution acquisition unit 135.

The above-described constituent elements are connected to each other via a bus 1010.

Figure 3:
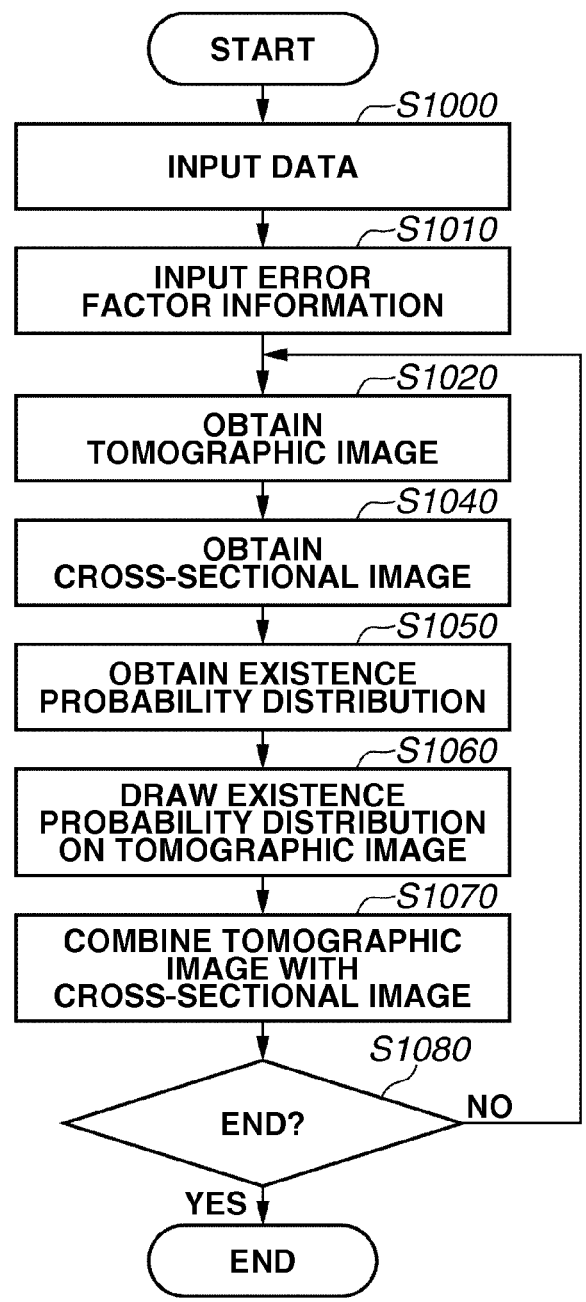
FIG. 3 is a flowchart illustrating an example procedure of processing that can be performed by the information processing apparatus according to the first exemplary embodiment.

FIG. 3 is a flowchart illustrating an example procedure of entire processing that can be performed by the information processing apparatus 100 according to the first exemplary embodiment. To realize the processing of the flowchart illustrated in FIG. 3, the CPU 1001 executes a program that can realize the functions of respective units. It is presumed that at this moment (namely, before starting the following processing) a program code of the flowchart illustrated in FIG. 3 is already loaded into the RAM 1002 from, for example, the external storage device 1007.

In step S1000, the information processing apparatus 100 obtains three-dimensional image data from the data server 190, as processing to be performed by the three-dimensional image data acquisition unit 120. Further, the information processing apparatus 100 obtains information representing the region of interest from the data server 190, as processing to be performed by the region-of-interest acquisition unit 122. In the present exemplary embodiment, the information representing the region of interest is, for example, the position of a lesion of interest or coordinate values of a group of points that are positioned along the boundary of a lesion of interest region. The position of a lesion of interest is, for example, the centroid position of the lesion of interest region.

In step S1010, the information processing apparatus 100 obtains various error factor information to be used in the calculation of an existence probability distribution from the data server 190, as processing to be performed by the distribution acquisition unit 135. For example, the information processing apparatus 100 obtains information representing the type of the position and orientation sensor (e.g., sensor A or sensor B) that can measure the position and orientation of the ultrasonic probe, as error factor information, from the data server 190.

In step S1020, the information processing apparatus 100 obtains an ultrasonic tomographic image from the second medical image collection apparatus 180, as processing to be performed by the tomographic image acquisition unit 110. Further, the information processing apparatus 100 obtains the position and orientation of the ultrasonic probe at the capturing timing of the above-described ultrasonic tomographic image from the second medical image collection apparatus 180, as processing to be performed by the position and orientation acquisition unit 112. Then, the information processing apparatus 100 calculates the position and orientation of the ultrasonic tomographic image in the coordinate system of the MRI apparatus, using calibration data stored beforehand as known values, with reference to the position and orientation of the ultrasonic probe in the reference coordinate system.

In step S1040, the information processing apparatus 100 generates a cross-sectional image of a reference image that corresponds to the ultrasonic tomographic image obtained in step S1020, as processing to be performed by the cross-sectional image generation unit 130. More specifically, the information processing apparatus 100 generates a cross-sectional image, which can be derived from the three-dimensional volume data obtained in step S1000, as an image taken along a cross section comparable to the ultrasonic tomographic image, based on the position and orientation of the ultrasonic tomographic image obtained in step S1020.

In step S1050, the information processing apparatus 100 calculates the existence probability distribution of a corresponding region on the ultrasonic tomographic image obtained in step S1020, as processing to be performed by the distribution acquisition unit 135.

More specifically, first, the distribution acquisition unit 135 estimates a corresponding region that corresponds to the region of interest in the ultrasonic coordinate system. For example, in a case where the given information representing the region of interest is the position of a lesion of interest, the distribution acquisition unit 135 can estimate the position of a corresponding lesion in the ultrasonic coordinate system as information representing the corresponding region. Further, in a case where the given information representing the region of interest is coordinate values representing a group of points positioned on the boundary of a lesion of interest region, the distribution acquisition unit 135 can estimate coordinate values representing the group of points positioned on the boundary of a corresponding lesion region in the ultrasonic coordinate system, as information representing the corresponding region. The above-described estimation can be performed based on the position and orientation of the ultrasonic tomographic image obtained by the position and orientation acquisition unit 112.

Next, the distribution acquisition unit 135 calculates the existence probability distribution of the corresponding region on the ultrasonic tomographic image based on the above-described estimated corresponding region and the error factor information obtained in step S1010.

In a case where the information representing the corresponding region is the position of the corresponding lesion, it is useful to presume that the existence probability distribution of the corresponding region resembles a normal distribution. In this case, it is useful to determine a standard deviation of the distribution beforehand for each type of the position and orientation sensor and select an appropriate standard deviation of the distribution according to the sensor type given as the error factor information. The processing for giving the standard deviation of the distribution can be performed based on other error factor information.

If it is presumed that the existence probability distribution of the corresponding region resembles a normal distribution, a three-dimensional existence probability distribution of the corresponding lesion in the ultrasonic coordinate system can be defined by a distance function that represents the distance from an estimated position of the corresponding lesion. In this case, the probability that an actual corresponding lesion exists in a sphere whose center is positioned at the estimated position of the corresponding lesion and whose radius is equal to the distance from the center can be calculated as an integrated value of a normal distribution function in the sphere. The distribution acquisition unit 135 obtains concentric spheres having the center at the estimated position of the corresponding lesion and derived by classifying the probability with reference to predetermined threshold values (e.g., 90%, 95%, 98%, and 99.5%). The concentric spheres classified in the above-described manner indicate three-dimensional regions where the existence probability of a region corresponding to the region of interest becomes a specific value. Further, the existence probability distribution of the corresponding lesion on the ultrasonic tomographic image can be defined using concentric circles, which define regions (i.e., cross sections of concentric spheres) where the concentric spheres intersect a plane that includes the tomographic image. The distribution acquisition unit 135 calculates the central position of these concentric circles on the ultrasonic tomographic image and radii of respective circles, as information indicating the existence probability distributions of the corresponding lesion. Any conventional method is usable to calculate a region where a sphere intersects a plane in a three-dimensional space.

Figure 4:
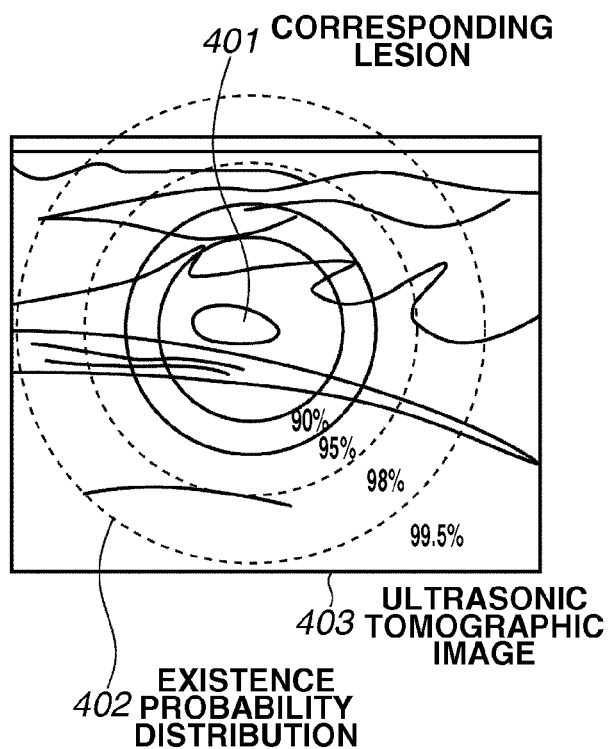
FIG. 4 illustrates an example display of a probability distribution that can be realized by the information processing apparatus.

In step S1060, the information processing apparatus 100 draws (superimposes) information indicating the existence probability distribution of the corresponding lesion on the ultrasonic tomographic image calculated in step S1050 on the ultrasonic tomographic image, as processing to be performed by the image combining unit 140. For example, the information processing apparatus 100 draws a line of the concentric circle calculated in step S1050 on the ultrasonic tomographic image. In this case, it is desired to change the line type of each circular line depending on the probability represented by the circle. For example, it is useful to change the thickness, color, or density of each line or select the line type between a solid line and a dotted line. Further, it is useful to change the intervals of dots that constitute each dotted line. Further, it is useful to display numerical values (e.g., 90%, 95%, 98%, and 99.5% according to the above-described example) in the vicinity of respective circles in such a way as to indicate the existence probability of the corresponding lesion inside the corresponding sphere. Further, it is useful to obtain and display an existence probability of the corresponding lesion in each space between two neighboring spheres (i.e., a difference in probability between inner and outer spheres). In this case, numerical values to be displayed in the vicinity of respective circles are 90%, 5%, 3%, and 1.5% according to the above-described example. As a result of the processing performed in step S1060, a composite image illustrated in FIG. 4 that includes an existence probability distribution 402 of a corresponding lesion 401 superimposed on an ultrasonic tomographic image 403 can be generated. Further, it is useful to set the predetermined threshold values in step S1050 based on the standard deviation of the distribution, in such a way as to display character information (e.g., σ, 1.5σ, 2σ, 2.5σ, and 3σ) indicating respective values in the vicinity of respective circles.

In step S1070, the information processing apparatus 100 combines the cross-sectional image obtained in step S1040 with the tomographic image obtained in step S1060, as processing to be performed by the image combining unit 140. For example, the information processing apparatus 100 generates a composite image that includes the cross-sectional image on the left (or right) side and the tomographic image on the other side. Then, the information processing apparatus 100 displays the composite image on a display unit 960, as processing to be performed by the display control unit 150. Further, if necessary, the information processing apparatus 100 outputs the composite image to an external device via the I/F 1009. It is also useful that the RAM 1002 stores a state of the composite image that can be used by another application.

In step S1080, the information processing apparatus 100 determines whether to terminate the entire processing. For example, the information processing apparatus 100 obtains a completion instruction that an operator can input by pressing a predetermined key (e.g., an end key) of the keyboard 1004. If the termination of the entire processing is confirmed (YES in step S1080), the information processing apparatus 100 terminates the entire processing. On the other hand, if the termination of the entire processing is not confirmed (No in step S1080), the operation returns to step S1010 to newly start the processing in step S1010 and subsequent steps for a newly captured ultrasonic tomographic image.

The information processing apparatus 100 completes the entire processing through the above-described sequential processes.

As described above, the information processing system according to the first exemplary embodiment can display an existence probability distribution of a corresponding lesion on an ultrasonic tomographic image at the time when an operator searches for the corresponding lesion, while taking a positional estimation error into consideration. As a result, it is unnecessary for the operator to search an excessively large region. Thus, it is feasible to reduce the work load in the search operation while reducing the amount of any unnecessary work. Further, even when an actual error is large, the operator can effectively search for a corresponding region while appropriately considering the displayed information.

Next, an modified example according to the first exemplary embodiment is described below. In the description of the first exemplary embodiment, it is presumed that the existence probability distribution resembles a normal distribution having the center positioned at the estimated position of the corresponding region. However, in some cases, the existence probability may not resemble a normal distribution. For example, the similar display can be realized even in a case where the existence probability of a corresponding lesion is given as an arbitrary distribution in a space. In this case, for example, the distribution acquisition unit 135 can select a minimum-volume region in which an integrated value of the existence probability becomes a predetermined value. Thus, even in a case where the existence probability distribution includes a deviation, the operator can efficiently identify the lesion position while viewing the deviation of the distribution superimposed on a tomographic image.

In the first exemplary embodiment, a cross-sectional image extracted from three-dimensional image data (i.e., reference image) is displayed together (in comparison) with an ultrasonic tomographic image. However, the display of the cross-sectional image can be omitted if it is unnecessary. In this case, acquisition of the three-dimensional image data (i.e., the reference image) or generation of the cross-sectional image can be omitted.

Next, a second exemplary embodiment of the present invention is described below. The information processing system according to the first exemplary embodiment performs processing on the assumption that no change occurs in the shape between a subject in a three-dimensional image data capturing operation and the subject in an ultrasonic image capturing operation (in other words, the subject is a rigid body). Then, the information processing system according to the first exemplary embodiment estimates an existence probability distribution of a region that corresponds to a region of interest in the ultrasonic coordinate system by measuring the position and orientation of the ultrasonic probe relative to the subject. In contrast, an information processing system according to the second exemplary embodiment estimates a deformation in shape between the subject in the three-dimensional image data capturing operation and the subject in the ultrasonic image capturing operation to obtain a corresponding region. Then, the information processing system according to the second exemplary embodiment estimates an existence probability distribution of the corresponding region while taking ambiguity of the deformation estimation into consideration. Hereinafter, differences between the information processing system according to the second exemplary embodiment and the information processing system according to the first exemplary embodiment are described below.

Figure 5:
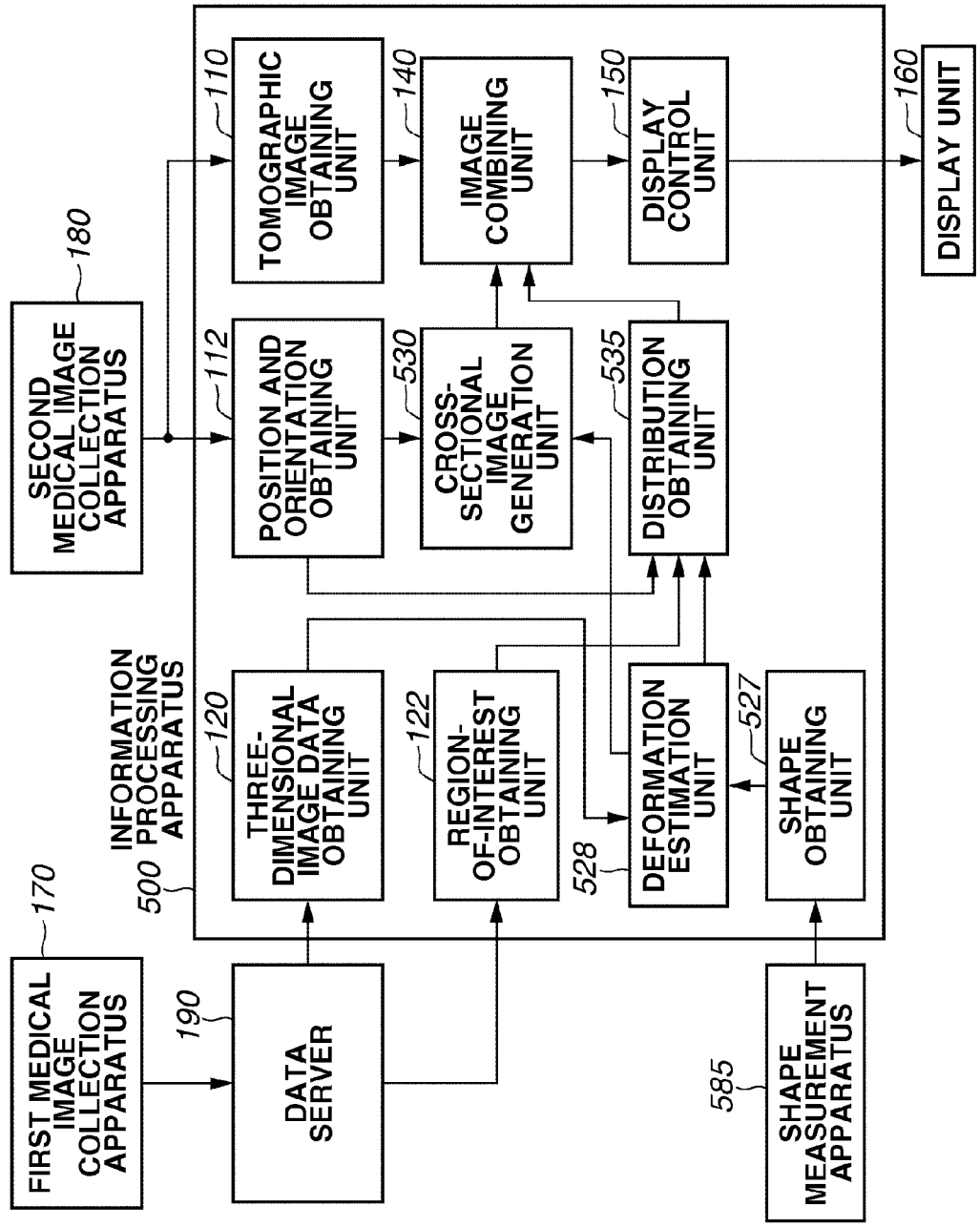
FIG. 5 illustrates a device configuration of an information processing system according to a second exemplary embodiment.

FIG. 5 illustrates an example configuration of the information processing system according to the second exemplary embodiment. Components or units similar to those illustrated in FIG. 1 are denoted by the same reference numerals and the description thereof is not repeated. As illustrated in FIG. 5, an information processing apparatus 500 according to the second exemplary embodiment includes a cross-sectional image generation unit 530 and a distribution acquisition unit 535 instead of employing the cross-sectional image generation unit 130 and the distribution acquisition unit 135 described in the first exemplary embodiment. Further, the information processing apparatus 500 includes a shape acquisition unit 527 and a deformation estimation unit 528, which are not described in the first exemplary embodiment. Further, the information processing apparatus 500 is connected to a shape measurement apparatus 585 in addition to the data server 190 and the second medical image collection apparatus 180. The shape measurement apparatus 585 is, for example, a range sensor. To obtain surface shape data, the shape measurement apparatus 585 measures a surface shape of a subject in an ultrasonic image capturing operation. The shape measurement apparatus 585 can be configured or modified in various ways to measure the shape of a target object. For example, the shape measurement apparatus 585 can be a stereo image measurement apparatus.

The shape acquisition unit 527 can obtain the surface shape data of the subject having been input to the information processing apparatus 500, and can output the obtained surface shape data to the deformation estimation unit 528.

The deformation estimation unit 528 can estimate a deformation state of the subject based on the surface shape data obtained by the shape acquisition unit 527. Further, the deformation estimation unit 528 can calculate a variation range of the deformation parameter (which is described in detail below), and can output the calculated variation range to the distribution acquisition unit 535. Further, the deformation estimation unit 528 can generate a three-dimensional deformation image (i.e., an image obtained by deforming three-dimensional image data into the shape of the subject in the ultrasonic image capturing operation), and can output the generated image to the cross-sectional image generation unit 530.

The distribution acquisition unit 535 can calculate an existence probability distribution of the corresponding region on the ultrasonic tomographic image based on the information representing the region of interest obtained by the region-of-interest acquisition unit 122 and the variation range of the deformation parameter estimated by the deformation estimation unit 528.

The cross-sectional image generation unit 530 can receive the three-dimensional deformation image (i.e., the output of the deformation estimation unit 528) and the position and orientation of the ultrasonic tomographic image (i.e., the output of the position and orientation acquisition unit 112) to generate a cross-sectional image that corresponds to the ultrasonic tomographic image based on the three-dimensional deformation image, and can output the generated cross-sectional image to the image combining unit 140.

Similar to the first exemplary embodiment, a computer having the basic configuration illustrated in FIG. 2 can realize the information processing apparatus 500 according to the second exemplary embodiment.

Figure 6:
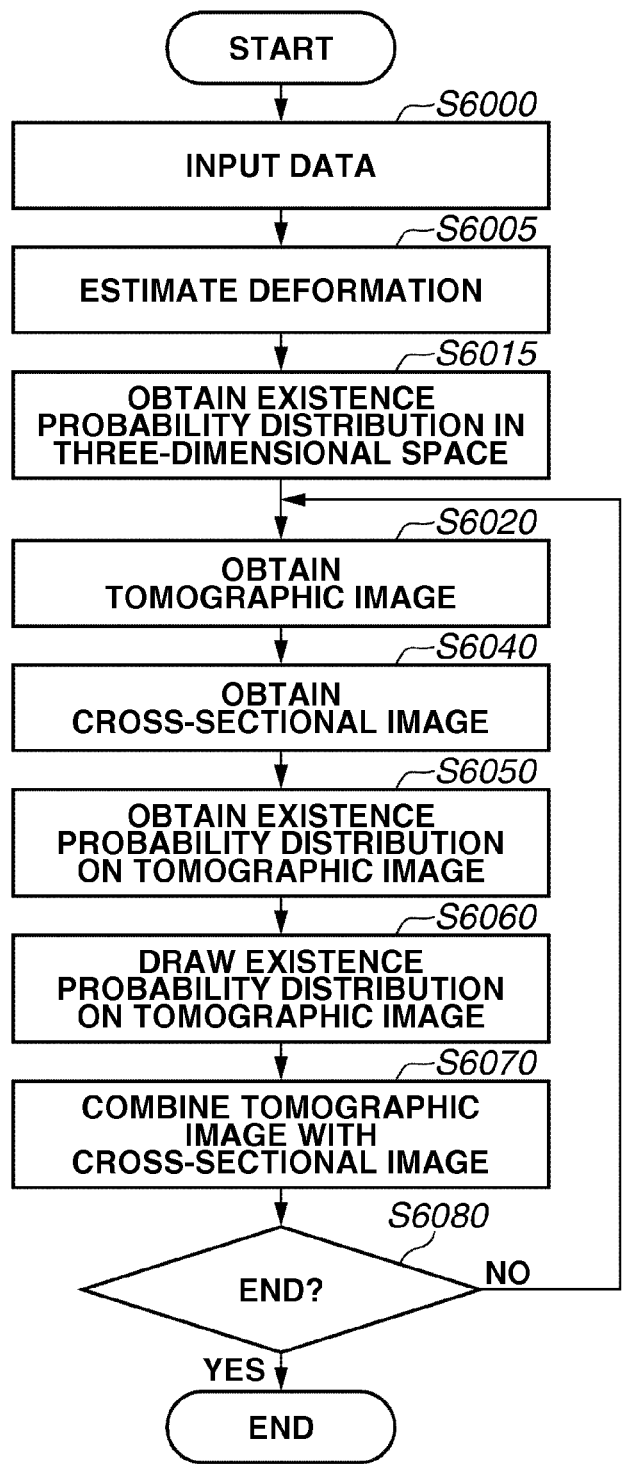
FIG. 6 is a flowchart illustrating an example procedure of processing that can be performed by the information processing apparatus according to the second exemplary embodiment.

FIG. 6 is a flowchart illustrating an example procedure of entire processing that can be performed by the information processing apparatus 500 according to the second exemplary embodiment. To realize the processing of the flowchart illustrated in FIG. 6, the CPU 1001 executes a program that can realize the functions of respective units. It is presumed that at this moment (namely, before starting the following processing) a program code of the flowchart illustrated in FIG. 6 is already loaded into the RAM 1002 from, for example, the external storage device 1007.

In step S6000, the information processing apparatus 500 performs processing that is similar to the processing performed in step S1000 described in the first exemplary embodiment, to obtain three-dimensional image data and information representing the region of interest. Further, the information processing apparatus 500 obtains surface shape data of a subject from the shape measurement apparatus 585, as processing to be performed by the shape acquisition unit 527.

In step S6005, the information processing apparatus 500 estimates a deformation state of the subject based on the surface shape data obtained in step S6000, as processing to be performed by the deformation estimation unit 528. For example, the information processing apparatus 500 generates a deformation model of the subject from the three-dimensional image data using a deformation estimation method discussed in Japanese Patent Application Laid-Open No. 2011-092263. The information processing apparatus 500 estimates deformation parameters by applying the generated deformation model to the shape data. Further, the information processing apparatus 500 outputs deformation simulation results derived from different parameters through the above-described estimation processing to the distribution acquisition unit 535. Further, the information processing apparatus 500 generates a three-dimensional deformation image (i.e., an image obtained by deforming the three-dimensional image data into the shape of the subject in the ultrasonic image capturing operation) based on the estimated deformation parameters.

In step S6015, the information processing apparatus 500 calculates an existence probability distribution of the corresponding region in a three-dimensional space based on a dispersion of the corresponding region that has varied through a plurality of deformation simulations, as processing to be performed by the distribution acquisition unit 535. More specifically, first, the information processing apparatus 500 calculates a deformed corresponding region for each of the deformation simulation results obtained in step S6005. Then, the information processing apparatus 500 allocates weighting factors, which reflect the distance from the corresponding regions estimated in step S6005, to respective corresponding regions in such a manner that the total of the allocated weighting factors is equal to 1. For example, the weighting factor can be allocated to become larger when the distance is short. Then, the information processing apparatus 500 sequentially selects some in order of shortness in the distance from the estimated corresponding regions, so that a sum of their weighting factors is equal to a predetermined value (e.g., 0.9, 0.95, 0.98, or 0.995).

In step S6020, the information processing apparatus 500 performs processing that is similar to the processing performed in step S1020 in the first exemplary embodiment, to obtain an ultrasonic tomographic image and the position and orientation of the ultrasonic tomographic image.

In step S6040, the information processing apparatus 500 generates a cross-sectional image of the three-dimensional deformation image that corresponds to the ultrasonic tomographic image having been obtained in step S6020, as processing to be performed by the cross-sectional image generation unit 530.

In step S6050, the information processing apparatus 500 calculates an existence probability distribution of the corresponding region on the ultrasonic tomographic image, as processing to be performed by the distribution acquisition unit 535. More specifically, the information processing apparatus 500 calculates an existence probability distribution of the corresponding region on a two-dimensional plane, which can be taken along an ultrasonic cross section from the existence probability distribution of the corresponding region in the three-dimensional space calculated in step S6015.

Processing to be performed insteps S6060, S6070, and S6080 is similar to the processing performed in steps S1060, S1070, and S1080 described in the first exemplary embodiment.

The information processing apparatus 500 completes the entire processing through the above-described sequential processes.

As described above, the information processing system according to the second exemplary embodiment estimates the deformation in shape between the subject in the three-dimensional image data capturing operation and the subject in the ultrasonic image capturing operation to obtain the corresponding region. Then, the information processing system according to the second exemplary embodiment calculates the existence probability distribution of the corresponding region while taking ambiguity of the deformation estimation into consideration. Thus, even in a case where a lesion of interest exists in a soft tissue (e.g., abreast) of the subject, a user can accurately recognize a search range for an actual corresponding region on a two-dimensional image and can efficiently search for the actual corresponding region.

Next, a third exemplary embodiment of the present invention is described below. The information processing system according to the first exemplary embodiment displays concentric spheres, in which the integrated value of the existence probability distribution becomes a predetermined value, as a method for displaying the existence probability distribution of the corresponding lesion. In contrast, an information processing system according to the third exemplary embodiment directly displays a superimposed image of the existence probability of the corresponding lesion at each pixel on a tomographic image. Differences between the information processing system according to the third exemplary embodiment and the information processing system according to the first exemplary embodiment are described in detail below.

The information processing system according to the present exemplary embodiment has a configuration similar to that illustrated in FIG. 1, except for a part of the processing to be performed by the distribution acquisition unit 135 and a part of the processing to be performed by the image combining unit 140. A procedure of processing that can be performed by the information processing system according to the present exemplary embodiment is similar to the processing procedure illustrated in FIG. 3, except for a part of the processing to be performed in step S1050 and step S1060.

In step S1050, the information processing apparatus 100 performs processing for obtaining an existence probability distribution of a corresponding lesion, which is similar to the processing performed in the first exemplary embodiment, as processing to be performed by the distribution acquisition unit 135. The information processing apparatus 100 according to the present exemplary embodiment performs processing similar to that described in the first exemplary embodiment until the information processing apparatus 100 obtains a distribution function. However, the information processing apparatus 100 according to the present exemplary embodiment does not calculate concentric spheres and their cross sections (i.e., concentric circles). Instead, the information processing apparatus 100 according to the present exemplary embodiment calculates an existence probability of a corresponding lesion at the position of each pixel on an ultrasonic tomographic image. It is however useful to perform processing for obtaining concentric circles similar to those described in the first exemplary embodiment.

In step S1060, the information processing apparatus 100 draws (superimposes) information representing the existence probability distribution of the corresponding lesion calculated in step S1050 on respective pixels of the ultrasonic tomographic image, as processing to be performed by the image combining unit 140. For example, the information processing apparatus 100 changes the color to be superimposed on the pixel according to a change in the value of existence probability. For example, when the existence probability value becomes larger, thinning down the color to be superimposed on the pixel is useful. Further, it is useful to obtain contour lines (i.e., equi-probability lines) of the existence probability for a predetermined value and superimpose the obtained contour lines on the tomographic image. However, in a case where the processing in step S1050 includes obtaining concentric circles similar to those described in the first exemplary embodiment, it is useful to additionally perform processing similar to the display processing performed in step S1060 according to the first exemplary embodiment.

The information processing apparatus 100 completes the entire processing through the above-described sequential processes.

The information processing system according to the third exemplary embodiment enables a user to recognize the existence position of the corresponding region without displaying a clear boundary (i.e., the cause of misunderstanding).

To realize each processing according to the exemplary embodiment of the present invention, it is useful to obtain a software program via a network or an appropriate storage medium and cause a personal computer or another comparable processing apparatus (e.g., a CPU or a processor) to execute the program.

A processing apparatus according to a fourth exemplary embodiment of the present invention enables a user to observe an MRI image (i.e., an image captured by the MRI apparatus) that captures a breast of a subject in a face-down state in comparison with an ultrasonic image (i.e., an image captured by the ultrasonic image capturing apparatus) that captures the same breast but in a face-up state. Further, the processing apparatus according to the present exemplary embodiment displays, on the ultrasonic image, an ultrasonic image region that corresponds to a region of interest (such as a lesion) extracted from the MRI image. In the present exemplary embodiment, the ultrasonic image region is a region that includes an ambiguity derived from an error in the above-described matching. The processing apparatus according to the present exemplary embodiment estimates a range of the error that occurs in the above-described matching and calculates a variation range of the region in the ultrasonic image (i.e., the range where the region of interest exists) due to the error. Thus, the processing apparatus according to the present exemplary embodiment can display the ultrasonic image including an existence range of a portion that corresponds to the region of interest in the MRI image.

The MRI image described in the present exemplary embodiment is a medical image as an example of the three-dimensional image. However, the three-dimensional image is not limited to the above-described example. For example, an X-ray CT image (i.e., an image captured by the X-ray CT apparatus) or a positron emission tomography (PET) image is another example of the three-dimensional image.

Figure 7:
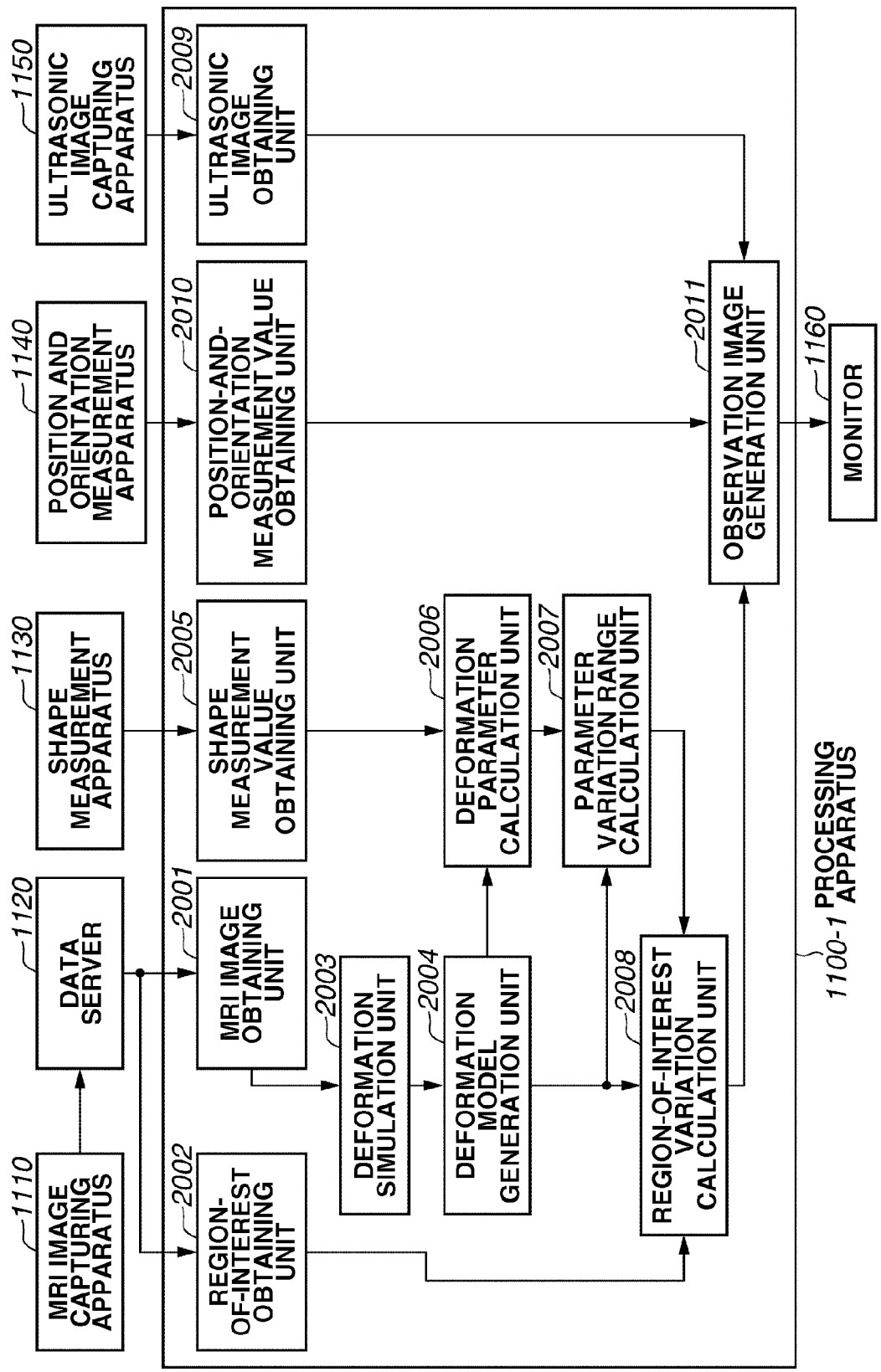
FIG. 7 schematically illustrates an example of a functional configuration of a processing system according to a fourth exemplary embodiment.

FIG. 7 schematically illustrates an example of a functional configuration of a processing system according to the fourth exemplary embodiment. The processing system according to the present exemplary embodiment, as illustrated in FIG. 7, includes a processing apparatus 1100-1, an MRI image capturing apparatus 1110, a data server 1120, a shape measurement apparatus 1130, a position and orientation measurement apparatus 1140, an ultrasonic image capturing apparatus 1150, and a monitor 1160.

The processing apparatus 1100-1 is composed of a plurality of functional units as illustrated in FIG. 7. More specifically, the processing apparatus 1100-1 includes an MRI image acquisition unit 2001, a region-of-interest acquisition unit 2002, a deformation simulation unit 2003, a deformation model generation unit 2004, a shape measurement value acquisition unit 2005, a deformation parameter calculation unit 2006, a parameter variation range calculation unit 2007, a region-of-interest variation calculation unit 2008, an ultrasonic image acquisition unit 2009, a position-and-orientation measurement value acquisition unit 2010, and an observation image generation unit 2011.

The processing apparatus 1100-1, as illustrated in FIG. 7, is connected to the data server 1120, the shape measurement apparatus 1130, the position and orientation measurement apparatus 1140, the ultrasonic image capturing apparatus 1150, and the monitor 1160.

The MRI image capturing apparatus 1110 is an apparatus that can capture an MRI image, i.e., an image including information relating to a three-dimensional region in the subject (i.e., a human body) that can be obtained using a nuclear magnetic resonance method. The MRI image capturing apparatus 1110 is connected to the data server 1120 and can transmit the captured MRI image to the data server 1120.

The data server 1120 is an apparatus that can store the MRI image captured by the MRI image capturing apparatus 1110 or information (e.g., coordinate values) indicating the position of the region of interest (e.g., lesion) extracted from the MRI image.

The ultrasonic image capturing apparatus 1150 can capture an ultrasonic image of the inside of the subject by bringing an ultrasonic probe (not illustrated) that transmits and receives ultrasonic waves into contact with the subject. In the present exemplary embodiment, the ultrasonic image capturing apparatus 1150 captures a two-dimensional B mode ultrasonic image, as an image of a cross-sectional area of a face-up subject.

The position and orientation measurement apparatus 1140 is an apparatus that can measure the position and orientation of the ultrasonic probe in the three-dimensional space. The position and orientation measurement apparatus 1140 is, for example, a magnetic type (or an optical type) six degrees of freedom measurement apparatus attached to the ultrasonic probe.

The shape measurement apparatus 1130 is an apparatus that can measure a body surface shape of the subject. The shape measurement apparatus 1130 can be constituted by a conventionally known member, such as a stylus that can measure the body surface shape by contacting the body surface of the subject or a range sensor that can optically measure the shape of the subject. In the present exemplary embodiment, the shape measurement apparatus 1130 is disposed adjacent to the ultrasonic image capturing apparatus 1150 and the position and orientation measurement apparatus 1140. The shape measurement apparatus 1130 can measure the body surface shape of the face-up subject to be captured by the ultrasonic image capturing apparatus 1150.

The monitor 1160 can display an image and information.

Next, the functional configuration of the processing apparatus 1100-1 illustrated in FIG. 7 is described in detail below.

The MRI image acquisition unit 2001 obtains an MRI image of the face-down subject, which has been captured by the MRI image capturing apparatus 1110, via the data server 1120.

The region-of-interest acquisition unit 2002 obtains information (e.g., coordinate values) relating to the position of the region of interest, such as a lesion of the subject, from the data server 1120.

The deformation simulation unit 2003 can calculate a shape of the face-down subject based on the MRI image obtained by the MRI image acquisition unit 2001. Further, the deformation simulation unit 2003 can calculate a deformation of the subject in the face-up state of the subject based on a simulation. In the present exemplary embodiment, the deformation simulation unit 2003 calculates a plurality of deformations under different conditions, using a processing method described below.

The deformation model generation unit 2004 can generate a deformation model that can express the deformation of the subject using a set of a plurality of parameters, based on the plurality of deformations calculated by the deformation simulation unit 2003. In the present exemplary embodiment, the above-described set of the plurality of parameters is referred to as "parameter vector."

The shape measurement value acquisition unit 2005 can obtain a shape measurement value relating to the body surface shape of the subject measured by the shape measurement apparatus 1130.

The deformation parameter calculation unit 2006 can calculate a parameter vector that can minimize an approximation error when the deformation model is used to approximate the body surface shape, based on the deformation model generated by the deformation model generation unit 2004 and the shape measurement value relating to the body surface shape of the face-up subject obtained by the shape measurement value acquisition unit 2005.

The parameter variation range calculation unit 2007 can calculate a variation range of the parameter vector based on the deformation model generated by the deformation model generation unit 2004 and the parameter vector calculated by the deformation parameter calculation unit 2006. The calculation of the variation range of the parameter vector can be executed based on the ambiguity relating to the calculation of the parameter vector performed by the deformation parameter calculation unit 2006. A detailed content of the processing to be performed by the parameter variation range calculation unit 2007 is described in detail below.

The region-of-interest variation calculation unit 2008 can calculate a variation range of the region of interest based on the information (e.g., coordinate values) relating to the position of the region of interest obtained by the region-of-interest acquisition unit 2002, the deformation model generated by the deformation model generation unit 2004, and the variation range (error variation range) of the parameter vector calculated by the parameter variation range calculation unit 2007. A detailed content of the processing to be performed by the region-of-interest variation calculation unit 2008 is described below.

The ultrasonic image acquisition unit 2009 can obtain an ultrasonic image, which can be obtained when the ultrasonic image capturing apparatus 1150 captures an image of the inside of the subject.

The position-and-orientation measurement value acquisition unit 2010 can obtain position-and-orientation measurement values that relate to the position and orientation of the ultrasonic probe measured by the position and orientation measurement apparatus 1140.

The observation image generation unit 2011 can generate an observation image based on the position-and-orientation measurement values of the ultrasonic probe obtained by the position-and-orientation measurement value acquisition unit 2010, the variation range of the region of interest calculated by the region-of-interest variation calculation unit 2008, and the ultrasonic image obtained by the ultrasonic image acquisition unit 2009. In the present exemplary embodiment, the observation image generated by the observation image generation unit 2011 can be displayed on the monitor 1160.

Figure 8:
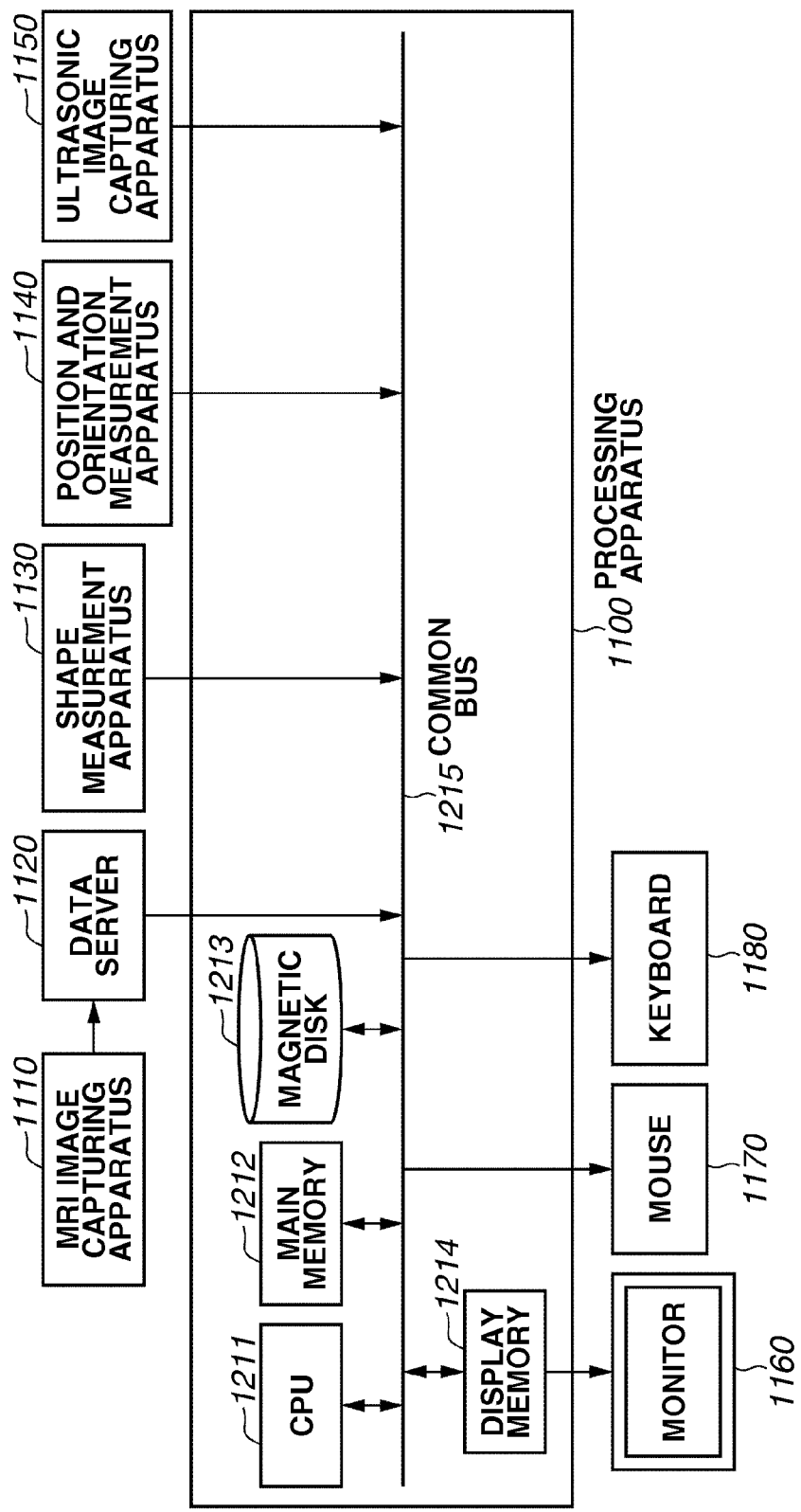
FIG. 8 schematically illustrates an example of a hardware configuration of the processing system according to the fourth exemplary embodiment.

FIG. 8 schematically illustrates an example of a hardware configuration of the processing system according to the fourth exemplary embodiment. In FIG. 8, constituent components similar to those illustrated in FIG. 7 are denoted by the same reference numerals. The processing system illustrated in FIG. 8 is different from the processing system illustrated in FIG. 7 in that a mouse 1170 and a keyboard 1180 are added.

Further, as an internal hardware configuration, the processing apparatus 1100 includes a central processing unit (CPU) 1211, a main memory 1212, a magnetic disk 1213, a display memory 1214, and a common bus 1215. For example, the processing apparatus 1100 can be realized by a personal computer (PC).

The CPU 1211 can control an operation to be performed by each hardware configuration of the processing apparatus 1100 in such a way as to control the entire operation of the processing apparatus 1100.

The main memory 1212 can store a control program to be executed by the CPU 1211 and can provide a work area when the CPU 1211 executes the program.

The magnetic disk 1213 can store an operating system (OS), a device driver of each peripheral device, and various software applications.

The display memory 1214 can temporarily store display-oriented data to be displayed on the monitor 1160.

The CPU 1211, the main memory 1212, the magnetic disk 1213, the display memory 1214, the data server 1120, the shape measurement apparatus 1130, the position and orientation measurement apparatus 1140, the ultrasonic image capturing apparatus 1150, the mouse 1170, and the keyboard 1180 can communicate with each other via common bus 1215.

The monitor 1160 is, for example, a CRT monitor or a liquid crystal monitor, which can display various images and information based on the display-oriented data supplied from the display memory 1214.

Each of the mouse 1170 and the keyboard 1180 enables a user (e.g., an operator) to perform a pointing input operation and input characters and commands.

The functional configuration (units 2001 to 2011) of the processing apparatus 1100-1 illustrated in FIG. 7 can be constituted, for example, by the CPU 1211 and the control program stored in the main memory 1212 illustrated in FIG. 8.

Next, an entire operation of the processing apparatus 1100-1 according to the present exemplary embodiment is described in detail below with reference to a flowchart illustrated in FIG. 9.

Figure 9:
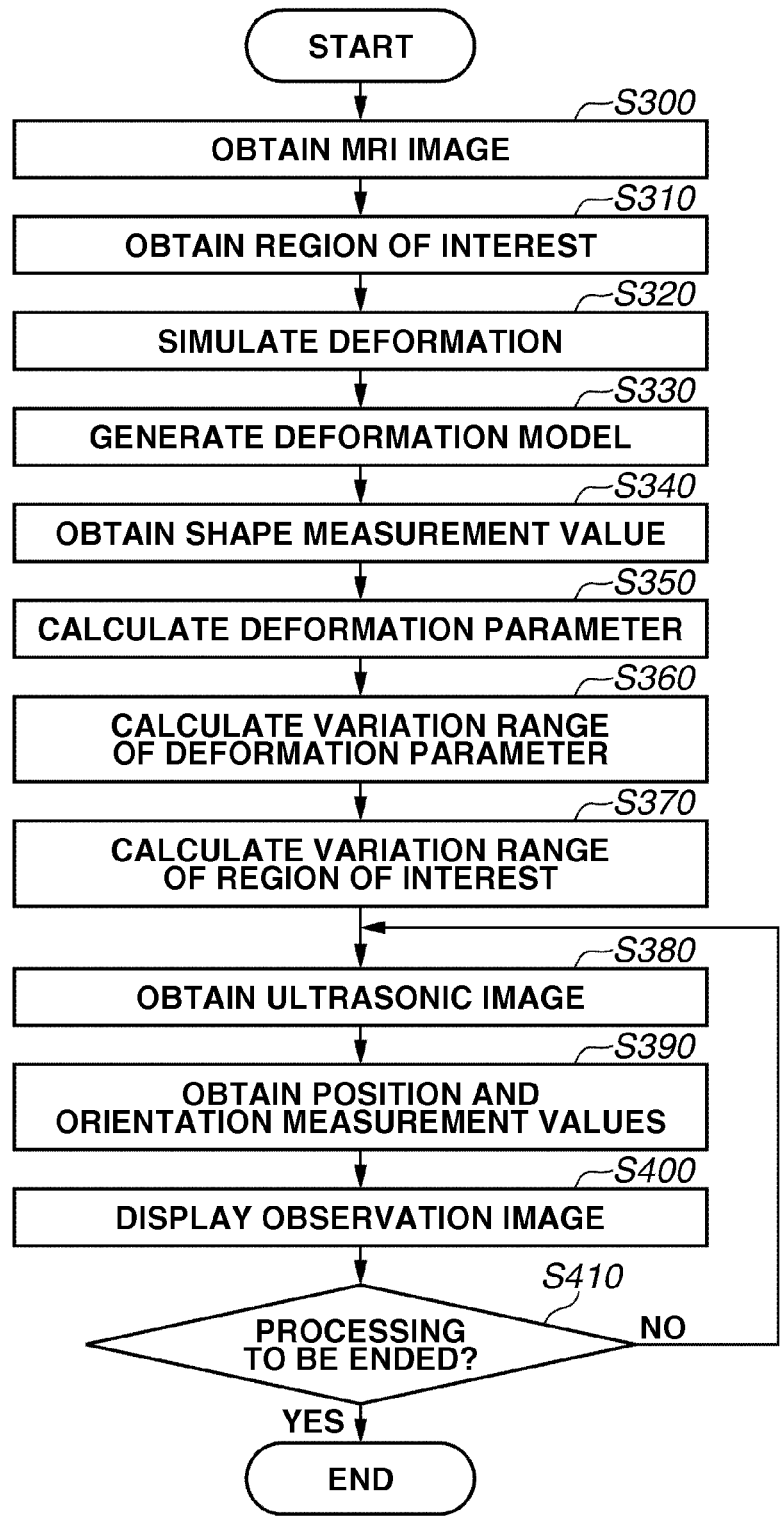
FIG. 9 is a flowchart illustrating an example procedure of processing that can be performed by a processing apparatus according to the fourth exemplary embodiment.

FIG. 9 is a flowchart illustrating an example procedure of processing that can be performed by the processing apparatus according to the fourth exemplary embodiment. In the present exemplary embodiment, the processing illustrated in FIG. 9 can be executed by the CPU 1211 illustrated in FIG. 8 based on the control program stored in the main memory 1212 illustrated in FIG. 8. Further, it is presumed that each processing result of the following processing to be performed by the processing apparatus can be stored in the main memory 1212 illustrated in FIG. 8.

In step S300, the MRI image acquisition unit 2001 illustrated in FIG. 7 obtains a three-dimensional MRI image (i.e., an image of the subject captured by the MRI image capturing apparatus 1110) from the data server 1120. In the present exemplary embodiment, the MRI image is an example image of a breast of a face-down subject.

In step S310, the region-of-interest acquisition unit 2002 illustrated in FIG. 7 obtains information (e.g., coordinate values) relating to the position of the region of interest, such as an internal lesion of the subject, from the data server 1120. In the present exemplary embodiment, the central position (or point) of the internal lesion of the subject represents the region of interest. In the following description, "p" represents position coordinate values of the central position (or point) of the lesion in an MRI image coordinate system. More specifically, in the present processing step, the region-of-interest acquisition unit 2002 obtains the coordinate values "p" representing the central position of the lesion in the subject stored in the data server 1120.

In step S320, the deformation simulation unit 2003 illustrated in FIG. 7 calculates a breast deformation of the subject, which is caused when the subject has changed its orientation from the face-down state (i.e., an MRI image capturing orientation) to the face-up state (i.e., an ultrasonic image capturing orientation), based on a physical simulation. For example, a conventionally known appropriate method (e.g., a finite element method) is employable to realize the above-described calculation processing. An example of the calculation processing method usable in this case is described in detail below.

First, the deformation simulation unit 2003 extracts a target region of the subject to be subjected to the simulation from the MRI image obtained in step S300. In the present exemplary embodiment, the target region is the breast of the subject. Therefore, the deformation simulation unit 2003 extracts a body surface including the breast and a region covered with a greater pectoral muscle surface and designates the extracted region as a simulation target region. The image processing of the MRI image can be configured to execute the above-described processing automatically. Alternatively, a user (or an operator) can manually designate a region to be extracted with the mouse 1170 or the keyboard 1180.

Subsequently, the deformation simulation unit 2003 divides the extracted simulation target region into meshes (i.e., a dissected region defined by a plurality of vertices). An appropriate conventionally known method can be used to automatically execute the above-described processing. In the present exemplary embodiment, a vector s=(x1,y1,z1, ..., xk,yk,zk, ..., xN,yN,zN)t represents the position coordinate values of vertices that constitute a mesh obtained by dividing the region, in which "k" is a suffix allocated to each vertex of the mesh and satisfies the relationship $1 \leq k \leq N$. Further, "N" represents the total number of the vertices. In the present exemplary embodiment, it is presumed that Q pieces of vertices are positioned on the body surface of the subject ($Q \leq N$). Further, it is presumed that the first element to the (3×Q)th element of the vector s store position coordinate values of the Q pieces of vertices positioned on the body surface of the subject. Further, the values of respective elements constituting the vector s are the position coordinate values defined in the MRI image coordinate system.

Subsequently, the deformation simulation unit 2003 sets simulation conditions (including mechanical properties of a material that constitutes a simulation target region and a variation in the direction of gravity that causes a deformation), and generates a stiffness matrix based on the simulation conditions. For example, in a case where a linear elastic body is targeted with respect to the mechanical properties of the material, the simulation conditions to be set by the deformation simulation unit 2003 can include Young's modulus and Poisson's ratio. However, in the present exemplary embodiment, it is presumed that the Young's modulus and the Poisson's ratio are unknown although a linear elastic body can be targeted with respect to the mechanical properties of the material that constitutes the subject. More specifically, the deformation simulation unit 2003 performs the following processing for each of a plurality of different conditions, while setting a plurality of combinations of the Young's modulus and the Poisson's ratio. For example, the deformation simulation unit 2003 selects one of 500 [Pa], 1000 [Pa], 2000 [Pa] and 4000 [Pa] as the Young's modulus and selects one of 0.3, 0.4, and 0.49 as the Poisson's ratio to obtain twelve combinations of the Young's modulus and the Poisson's ratio (i.e., simulation conditions). The deformation simulation unit 2003 performs the following processing for each of the simulation conditions.

Subsequently, the deformation simulation unit 2003 sets a load to be applied to each vertex of the mesh that constitutes the target region. The deformation simulation unit 2003 calculates, as a setting value, a load caused by a difference in the direction of gravity, in the present exemplary embodiment in which the processing apparatus simulates a deformation when the orientation of the subject is changed from the face-down state to the face-up state.

Subsequently, the deformation simulation unit 2003 calculates a variation of each vertex that constitutes the mesh (i.e., a dissected part of the region to be simulated) based on the stiffness matrix and the load calculated in the above-described manner. The above-described processing to be performed by the deformation simulation unit 2003 is equivalent to calculating a deformation state of the subject. In the present exemplary embodiment, the deformation state is information that can be expressed using a numerical value representing the position of each vertex of a deformed mesh. In the present exemplary embodiment, a deformation state of the subject calculated for each of the twelve different simulation conditions can be expressed using a vector di=(x1i, y1i, z1i, ..., xNi, yNi, zNi)t that represents the position coordinate values of deformed vertices, in which "i" is a suffix allocated to each of the simulation conditions and satisfies the relationship $1 \leq i \leq 12$. Further, the values of respective elements constituting the vector di are the position coordinate values defined in the MRI image coordinate system.

According to the above-described example, the simulation method employed to obtain the deformation state of the subject is the finite element method. However, the simulation method according to the present invention is not limited to the above-described example. Any other appropriate method (e.g., a difference method or a particle method) is employable to simulate the deformation state of the subject. Further, according to the above-described example, the target region to be simulated is the breast of the subject. However, the present invention is not limited to the above-described example. For example, another region of a human body or an industrial part (i.e., a member not related to a human body) can be designated as a target region to be simulated. Processing to be performed in this case is similar to that performed according to the above-described method.

In step S330, the deformation model generation unit 2004 illustrated in FIG. 7 generates a deformation model that parametrically expresses the deformation based on the simulation result di relating to the deformation of the subject calculated in step S320. For example, an example deformation model generation method is the method discussed in Yipeng Hu, et al., "A Statistical motion model based on biomechanical simulations for data fusion during image-guided prostate interventions," MICCAI 2008, Part I, LNCS 5241, pp. 737-744, 2008. (which is referred to as non-patent literature 1).

According to the method discussed in the non-patent literature 1, first, the deformation model generation unit 2004 generates a normalized vector that can be expressed using the following formula (1) based on the simulation result di.

$$\tilde{d}_i = d_i - d_{ave} \quad (1)$$

In formula (1), "i" is a suffix allocated to each of the simulation results and satisfies the relationship $1 \leq i \leq M$. Further, "M" represents the total number of the simulation results. In the present exemplary embodiment, the total number of the simulation results is equal to 12 (i.e., M=12). Further, "$d_{ave}$" represents a mean vector of the simulation results, which can be expressed using the following formula (2).

$$d_{ave} = \frac{1}{M} \sum_{i=1}^{M} d_i \quad (2)$$

Then, the deformation model generation unit 2004 analyzes a main component of the normalized vector (i.e., the vector expressed using formula (1)), and calculates (M−1) pieces of main component vectors, ranging from the first main component vector e1 to the (M−1)th main component vector eM−1.

The generation of the deformation model to be performed by the deformation model generation unit 2004 in the present processing step can be realized based on the calculation of the mean vector $d_{ave}$ and the main component vector ei. In the present exemplary embodiment, the above-described information is referred to as the deformation model.

According to the above-described example, the total number of the main component vectors to be calculated is (M−1), which is smaller by one than the total number M of the simulation results that can be calculated using a plurality of simulation results derived from different conditions. The (M−1) pieces of main component vectors constitute the deformation model. However, the present invention is not limited to the above-described example. For example, it is useful to use a part of the main component vectors calculated using the above-described method as main component vectors that constitute the deformation model. In this case, it is desired to select main component vectors that have higher main component scores (contribution rates), among the main component vectors calculated using the above-described method, to constitute the deformation model. Further, it is desired to use a cumulative contribution rate to determine the total number of the main component vectors that constitute the deformation model. According to the above-described method, efficiently constructing the deformation model becomes feasible.

Hereinafter, the deformation model is described in more detail.

It is feasible to generate a deformation state "r" that includes the simulation result di by calculating a linear sum that can be obtained by weighting the main component vectors calculated through the above-described processing with parameters c1 to cM−1 whose number is equal to the total number of the main component vectors, as illustrated in the following formula (3).

$$r = d_{ave} + \sum_{i=1}^{M-1} c_i e_i \quad (3)$$

The formula (3) can be rewritten into a combined matrix and vector format, as expressed with the following formula (4).

$$r = d_{ave} + Ec \quad (4)$$

In the above-described formula (4), "E" is a matrix including the main component vectors e1 to eM−1 arranged in the horizontal direction and "c" represents a vector including the parameters c1 to cM−1 arranged in the vertical direction. In the present exemplary embodiment, the vector "c" is referred to as the parameter vector. The deformation model generated in step S330 can express various deformation states, when each element of the parameter vector is changeable, through the calculation process of formula (4).

In the present exemplary embodiment, "rk" represents position coordinate values of respective vertices constituting a mesh in a deformation state expressed by the deformation model. The position coordinate values of respective vertices of a mesh can be regarded as a function rk(c) that is variable depending on the parameter vector c.

In step S340, the shape measurement value acquisition unit 2005 illustrated in FIG. 7 performs processing for obtaining a shape measurement value relating to the body surface shape of the subject measured by the shape measurement apparatus 1130. In the present exemplary embodiment, it is presumed that the shape measurement value relating to the body surface shape of the subject can be obtained as a group of position coordinate values defined in the MRI image coordinate system. In the present exemplary embodiment, the shape measurement value relating to the body surface shape of the subject can be expressed using a group "qj" of three-dimensional vectors, in which "j" is a suffix allocated to each of the plurality of position coordinate values and satisfies the relationship 1≤j≤K. Further, "K" represents the total number of the shape measurement values.

In step S350, the deformation parameter calculation unit 2006 illustrated in FIG. 7 calculates deformation parameters of the deformation model in which the deformation state expressed by the deformation model generated in step S330 coincide with the shape measurement values relating to the body surface shape of the subject obtained in step S340. More specifically, the deformation parameter calculation unit 2006 performs processing for obtaining an optimum deformation parameter vector "copt" that can minimize a distance function Ldist(c) defined by the following formula (5).

$$L_{dist}(c) = \frac{1}{K} \sum_{j=1}^{K} \min_{k=1;k \leq Q} (\|q_j - r_k(c)\|^2) \quad (5)$$

More specifically, the deformation parameter calculation unit 2006 obtains vertices on the mesh surface closest to the measured body surface positions and estimates a deformation that minimizes the sum of their distances. The above-described processing can be performed by solving a nonlinear optimization problem. For example, a conventionally known method (e.g., a steepest descent method or a quasi-Newton method) is usable.

In step S360, the parameter variation range calculation unit 2007 illustrated in FIG. 7 performs processing for calculating a variation range of the deformation parameter vector in which the distance function expressed by the formula (5) becomes equal to or less than a predetermined value. More specifically, the parameter variation range calculation unit 2007 illustrated in FIG. 7 calculates a variation range of the deformation parameter vector that includes the optimum deformation parameter vector "copt" calculated in step S350 and in which the difference between the distance function expressed by the formula (5) and the Ldist (copt) is within a predetermined range. An example variation range calculation method is described in detail below.

First, the parameter variation range calculation unit 2007 generates a variation parameter vector c', which can be expressed using the following formula (6). The generated variation parameter vector c' includes a first element value that is greater by a small amount δ than the first element value of the optimum deformation parameter vector "copt."

$$c' = c_{opt} + \begin{pmatrix} \delta \\ 0 \\ \vdots \\ 0 \end{pmatrix} \quad (6)$$

Then, the parameter variation range calculation unit 2007 executes the calculation defined by the formula (5) using the variation parameter vector c' and calculates a distance function value Ldist(c') that corresponds to the variation parameter vector c'. Then, the parameter variation range calculation unit 2007 repetitively increases the small amount δ as long as the difference between the distance function value Ldist(c') and the Ldist(copt) is within the predetermined range.

Finally, the parameter variation range calculation unit 2007 records, as an upper-limit width (δUPPER_1) of the first element of the deformation parameter vector, the increased amount applied to the first element value of the variation parameter vector c' when the difference between the Ldist(c') and the Ldist(copt) becomes equal to or greater than the predetermined range. Further, the parameter variation range calculation unit 2007 executes processing similar to the above-described processing while reducing the small amount S and records the similarly obtained reduction amount as a lower-limit width (δLOWER_1) of the first element of the deformation parameter vector. Further, the parameter variation range calculation unit 2007 performs similar processing for each of the second and remaining elements that constitute the parameter vector and records an upper-limit width and a lower-limit width respectively calculated in the above-described manner.

In the present exemplary embodiment, δUPPER_1, . . . , and δUPPER_M−1 represent upper-limit widths and δLOWER_1, . . . , and δLOWER_M−1 represent lower-limit widths of respective elements of the deformation parameter vector calculated by the above-described processing.

In step S370, the region-of-interest variation calculation unit 2008 illustrated in FIG. 7 performs processing for calculating a variation range of the region of interest obtained in step S310, based on the information (e.g., coordinate values) relating to the position of the region of interest obtained in step S310, the deformation model generated in step S330, and the variation range of the parameter vector calculated in step S360. An example method for calculating the variation range of the region of interest is described below.

First, the region-of-interest variation calculation unit 2008 generates a group of deformation parameter vectors based on the upper-limit value and the lower-limit value calculated in step S360 for each element constituting the deformation parameter vector. For example, the region-of-interest variation calculation unit 2008 generates a group of deformation parameter vectors for the first and second elements through the calculations defined by the following formulae (7) to (10).

$$c_{UPPER\_1} = c_{opt} + \begin{pmatrix} \delta_{UPPER\_1} \\ 0 \\ \vdots \\ 0 \end{pmatrix} \quad (7)$$

$$c_{LOWER\_1} = c_{opt} + \begin{pmatrix} -\delta_{LOWER\_1} \\ 0 \\ \vdots \\ 0 \end{pmatrix} \quad (8)$$

$$c_{UPPER\_2} = c_{opt} + \begin{pmatrix} 0 \\ \delta_{UPPER\_2} \\ 0 \\ \vdots \\ 0 \end{pmatrix} \quad (9)$$

-continued $$c_{LOWER\_2} = c_{opt} + \begin{pmatrix} 0 \\ -\delta_{LOWER\_2} \\ 0 \\ \vdots \\ 0 \end{pmatrix} \quad (10)$$

Similarly, the region-of-interest variation calculation unit 2008 generates a group of deformation parameter vectors (i.e., cUPPER_3 to cUPPER_M−1 and cLOWER_3 to cLOWER_M−1) for the third and remaining elements.

Then, the region-of-interest variation calculation unit 2008 calculates a deformation state of the subject using the formula (4) for each group of deformation parameter vectors. In the present exemplary embodiment, rUPPER_1 to rUPPER_M−1 and rLOWER_1 to rLOWER_M−1 represent calculation results obtained in this case. Further, the region-of-interest variation calculation unit 2008 performs warping processing on the region of interest obtained in step S310 with reference to these deformation states to calculate a group of deformed regions of interest pUPPER_1 to pUPPER_M−1 and pLOWER_1 to pLOWER_M−1. The above-described processing can be executed using a conventionally known method based on position coordinate values "s" of the non-deformed mesh vertices in the simulation target region and position coordinate values of the deformed mesh vertices (i.e., rUPPER_1 to rUPPER_M−1 and rLOWER_1 to rLOWER_M−1). Then, the region-of-interest variation calculation unit 2008 calculates a minimum ellipsoid that includes the group of deformed regions of interest and designates an inside region of the calculated ellipsoid as the variation range of the region of interest.

Figure 10:
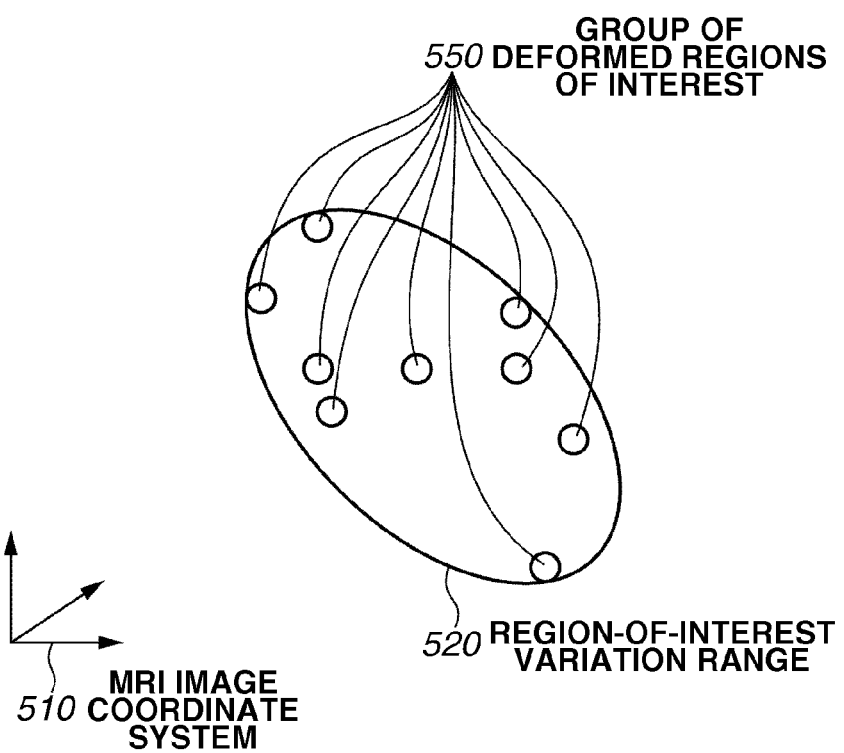
FIG. 10 schematically illustrates example processing to be performed in step S370 illustrated in FIG. 9, according to the fourth exemplary embodiment.

FIG. 10 schematically illustrates the processing to be performed in step S370 illustrated in FIG. 9 according to the fourth exemplary embodiment.

The illustration of FIG. 10 includes a group of deformed regions of interest 550, i.e., a group of position coordinate values of the above-described pUPPER_1 to pUPPER_M−1 and pLOWER_1 to pLOWER_M−1, in an MRI image coordinate system 510. Then, the region-of-interest variation calculation unit 2008 illustrated in FIG. 7 calculates a region-of-interest variation range 520 as the inside region of a minimum ellipsoid that encompasses the group of deformed regions of interest 550. The variation range of the region of interest expressed using an ellipsoid can be replaced by an appropriate numerical formula composed of coefficients if it can represent the ellipsoid in the MRI image coordinate system 510, or can be replaced by a binary volume defined in the MRI image coordinate system 510. In short, any information is usable if it can determine whether arbitrary position coordinate values are present in the variation range of the region of interest.

According to the above-described example, the variation range of the region of interest is expressed using an ellipsoid. However, the present invention is not limited to the above-described example. For example, any other arbitrary shape (e.g., a sphere or a rectangular parallelepiped) is usable.

In step S380, the ultrasonic image acquisition unit 2009 illustrated in FIG. 7 obtains an ultrasonic image of a breast of the subject in a face-up state, which has been captured by the ultrasonic image capturing apparatus 1150.

In step S390, the position-and-orientation measurement value acquisition unit 2010 illustrated in FIG. 7 obtains position-and-orientation measurement values that relate to the position and orientation of the ultrasonic probe measured by the position and orientation measurement apparatus 1140. In the present exemplary embodiment, the position-and-orientation measurement value acquisition unit 2010 performs conventionally known calibration processing on the measurement values obtained by the position and orientation measurement apparatus 1140 to obtain a position-and-orientation relationship between the probe coordinate system and the MRI image coordinate system. The probe coordinate system includes the origin at the center of an image plane of the ultrasonic probe (i.e., a plane that contacts the subject) and the Y axis extending in the radial direction of an ultrasonic beam. Further, the probe coordinate system includes the X axis included in an image plane of the ultrasonic image captured by the ultrasonic image capturing apparatus 1150 and extending in a direction perpendicular to the Y axis. Further, the direction of an outer product of the X axis and the Y axis coincides with the Z axis. The probe coordinate system is an orthogonal coordinate system defined in the above-described manner. In the present exemplary embodiment, it is presumed that the image coordinate system of the ultrasonic image obtained in step S380 coincides with the probe coordinate system (i.e., a plane of Z=0).

In step S400, the observation image generation unit 2011 illustrated in FIG. 7 generates an observation image by superimposing the variation range of the region of interest calculated in step S370 on the ultrasonic image obtained in step S380, based on the position-and-orientation measurement values obtained in step S390. Then, the observation image generation unit 2011 performs processing for displaying the generated observation image on the monitor 1160 illustrated in FIG. 7. An example of the processing to be performed in step S400 is described in detail below.

First, the observation image generation unit 2011 calculates the position and orientation of the image plane of the ultrasonic image in the MRI image coordinate system, with reference to the position and orientation of the ultrasonic probe measurement value obtained in step S390. Then, the observation image generation unit 2011 displays an image of the ellipsoidal region (i.e., the calculated variation range of the region of interest) superimposed on the ultrasonic image, based on the relationship with the position and orientation of the image plane. The above-described processing is described in detail below with reference to FIGS. 11A and 11B.

FIGS. 11A and 11B schematically illustrate the processing to be performed in step S400 illustrated in FIG. 9, according to the fourth exemplary embodiment.

The illustration of FIG. 11A includes an ultrasonic image 600 obtained in step S380. The ultrasonic image 600 is an ultrasonic captured image of a predetermined plane region in a probe coordinate system 610. The probe coordinate system 610 defines a position-and-orientation relationship relative to the MRI image coordinate system 510, based on the position-and-orientation measurement values obtained in step S390. Further, the region-of-interest variation range 520 calculated in step S370 is the ellipsoidal region defined in the MRI image coordinate system 510. Therefore, a cross region 630 where the ellipsoidal region intersects with the ultrasonic image 600 can be uniquely defined as an elliptic region in the MRI image coordinate system 510.

FIG. 11B illustrates an example of an observation image that includes the ultrasonic image 600 and the cross region 630 positioned on the ultrasonic image plane, which is displayed in the probe coordinate system 610. As illustrated in FIG. 11B, the example observation image according to the present exemplary embodiment is an image drawn by superimposing the cross region 630 on the ultrasonic image 600. The processing apparatus according to the present exemplary embodiment displays the observation image generated through the above-described processing on the monitor 1160 via transmission of the observation image to the display memory 1214.

In step S410, the processing apparatus according to the present exemplary embodiment determines whether to terminate the processing. A user (i.e., an operator) can operate the mouse 1170 or the keyboard 1180 to perform an input operation to realize the determination processing in step S410.

Then, if it is determined to continue the processing (NO in step S410), the operation returns to step S380 to repeat the above-described processing.

On the other hand, if it is determined to terminate the processing (YES in step S410), the processing apparatus terminates the processing of the flowchart illustrated in FIG. 9.

The processing apparatus 1100-1 according to the present exemplary embodiment completes the entire processing through the above-described sequential processes.

As described above, the processing apparatus 1100-1 according to the present exemplary embodiment includes the MRI image acquisition unit (i.e., a first image acquisition unit) 2001 configured to obtain an MRI image (i.e., a first image) of the subject in a face-down state (i.e., a first state), which has been captured by the MRI image capturing apparatus (i.e., a first imaging apparatus) 1110.

Further, the processing apparatus 1100-1 according to the present exemplary embodiment includes the ultrasonic image acquisition unit (i.e., a second image acquisition unit) 2009 configured to obtain an ultrasonic image (i.e., a second image) of the subject in a face-up state (i.e., a second state), which has been captured by the ultrasonic image capturing apparatus (i.e., a second imaging apparatus) 1150.

Further, the processing apparatus 1100-1 according to the present exemplary embodiment includes the region-of-interest acquisition unit 2002 configured to obtain a region of interest from the MRI image (i.e., the first image).

Further, the processing apparatus 1100-1 according to the present exemplary embodiment includes the deformation model generation unit 2004 configured to generate a deformation model with a parameter that expresses a deformation state of the subject when the subject is brought into the face-up state (i.e., the second state) from the face-down state (i.e., the first state).

Further, the processing apparatus 1100-1 according to the present exemplary embodiment includes the shape measurement value acquisition unit 2005 configured to obtain a shape measurement value of the subject when the subject is in a face-up state (i.e., the second state).

Further, the processing apparatus 1100-1 according to the present exemplary embodiment includes the deformation parameter calculation unit 2006 configured to calculate a deformation parameter of the deformation model based on the deformation model and the shape measurement value.

Further, the processing apparatus 1100-1 according to the present exemplary embodiment includes the parameter variation range calculation unit 2007 configured to calculate a variation range of the deformation parameter based on the deformation model and the deformation parameter.

Further, the processing apparatus 1100-1 according to the present exemplary embodiment includes the region-of-interest variation calculation unit 2008 configured to calculate a variation range of the region of interest based on the region of interest obtained by the region-of-interest acquisition unit 2002, the deformation model, and the variation range of the deformation parameter.

Further, the processing apparatus 1100-1 according to the present exemplary embodiment includes the observation image generation unit 2011 configured to generate an observation image including the variation range of the region of interest presented on the ultrasonic image (i.e., the second image).

The processing system according to the present exemplary embodiment can provide a mechanism that can present, in an ultrasonic image, an existence range of a portion corresponding to the region of interest in an MRI image.

Next, a modified example according to the fourth exemplary embodiment is described below.

In the above-described fourth exemplary embodiment, in step S360 illustrated in FIG. 9, the processing apparatus calculates an upper-limit width and a lower-limit width for each element of the deformation parameter vector. Further, in step S370 illustrated in FIG. 9, the processing apparatus calculates a variation range of the region of interest based on the upper-limit width and the lower-limit width. However, the present invention is not limited to the above-described example. For example, the variation range of the deformation parameter vector to be calculated in the processing step S360 can be calculated as an arbitrary region of a space defined by the values of the deformation parameter vector (more specifically, M−1 dimensional (eleven-dimensional) parameter space in the present exemplary embodiment). In this case, for example, it is feasible to set a start point on the optimum deformation parameter vector "copt" calculated in step S350 illustrated in FIG. 9 and exploratorily obtain a region whose distance function (see the formula (5)) is within a predetermined value in the M−1 dimensional parameter space. Further, it is feasible to set the boundary of a region in the M−1 dimensional parameter space obtained through the above-described processing as the variation range of the deformation parameter vector. In this case, as processing to be performed in step S370 illustrated in FIG. 9, the processing apparatus calculates the variation range of the region of interest using a group of deformation parameter vectors positioned at the boundary of the region in the parameter space obtained through the above-described processing. Thus, according to the above-described method, the variation range of the region of interest can be accurately calculated.

The processing in step S360 illustrated in FIG. 9 described in the above-described fourth exemplary embodiment includes setting the start point on the optimum deformation parameter vector "copt" while causing the vector to vary slightly, and further includes calculating the variation range of the deformation parameter vector as a range in which the distance function defined by the formula (5) is within a predetermined value. However, the present invention is not limited to the above-described example. For example, the processing in step S360 can include calculating a differential value relating to each element of the optimum deformation parameter vector "copt" of the distance function defined by the formula (5) and calculating the variation range of the deformation parameter vector based on the calculated differential value. In this case, an amount proportional to a reciprocal of the calculated differential value relating to each element of the deformation parameter vector is set as the variation range of the deformation parameter vector. According to the above-described method, it is feasible to determine the variation range of the deformation parameter vector without requiring any searching method. Therefore, the processing can be efficiently performed.

The processing in step S330 illustrated in FIG. 9 described in the above-described fourth exemplary embodiment includes calculating main component vectors by analyzing results of a plurality of deformation simulations having been obtained by the processing in step S320 illustrated in FIG. 9, and further includes generating a deformation model that expresses a deformation state of the subject based on a linear sum of the main component vectors. However, the present invention is not limited to the above-described example. For example, the processing in step S330 can include storing the results of a plurality of deformation simulations having been obtained in step S320 illustrated in FIG. 9 together with deformation simulation conditions having been set beforehand, while associating them. The processing in step S330 can further include setting the parameters of the deformation model based on values relating to the deformation simulation conditions. In the present exemplary embodiment, the simulation conditions include the Young's modulus and the Poisson's ratio. Thus, a two-dimensional deformation parameter vector having two elements of the Young's modulus and the Poisson's ratio is usable to obtain a deformation model that expresses a deformation state. In this case, it is feasible to obtain a deformation model that expresses a deformation state of the subject relative to arbitrary two-dimensional parameters, as a continuous amount, by interpolating or extrapolating the results of the plurality of deformation simulations. More specifically, the M−1 dimensional deformation parameter vector described in the present exemplary embodiment is replaced by a two-dimensional deformation parameter vector composed of the Young's modulus and the Poisson's ratio. Further, in a case where the processing to be performed in steps S350, S360, and S370 illustrated in FIG. 9 includes calculating a deformation state of the deformation parameter vector, the deformation state can be calculated by interpolating or extrapolating the results of the plurality of deformation simulations. A method similar to that described in the first exemplary embodiment is usable to perform the remaining processing.

A processing apparatus according to a fifth exemplary embodiment of the present invention can present a variation range of the body surface shape obtained by a deformation estimation based on an error range in the estimation of the deformation of the subject, in addition to the mechanism of the processing apparatus according to the fourth exemplary embodiment. The above-described information is information indicating an ambiguity of the body surface shape obtained through the estimation. In other words, the above-described information is information indicating an ambiguity of the estimated deformation state. Thus, information for determining the necessity of adding the measurement of the body surface shape of the subject can be presented to a user. It is feasible to perform measurement of the body surface shape of the subject, which is required to calculate a deformation of the subject with a desired accuracy.

FIG. 12 schematically illustrates an example of a functional configuration of a processing system according to the fifth exemplary embodiment. In FIG. 12, constituent components similar to those of the processing system according to the fourth exemplary embodiment illustrated in FIG. 7 are denoted by the same reference numerals and the descriptions thereof are not repeated.

As illustrated in FIG. 12, a processing apparatus 1100-2 according to the present exemplary embodiment includes a shape variation calculation unit 2020 and a shape variation image generation unit 2021, in addition to the configuration of the processing apparatus 1100-1 according to the fourth exemplary embodiment illustrated in FIG. 7.

The shape variation calculation unit 2020 can calculate a variation range of the body surface shape of the subject having been obtained through the estimation, based on the deformation model generated by the deformation model generation unit 2004 and the variation range of the deformation parameter vector calculated by the parameter variation range calculation unit 2007.

The shape variation image generation unit 2021 can generate a visually recognizable shape variation image, based on the variation range of the body surface shape calculated by the shape variation calculation unit 2020.

Further, a hardware configuration of the processing system according to the present exemplary embodiment is similar to the hardware configuration of the processing system according to the fourth exemplary embodiment illustrated in FIG. 8 and, therefore, the description thereof is not repeated.

Next, an entire operation that can be performed by the processing apparatus 1100-2 according to the present exemplary embodiment is described in detail below with reference to a flowchart illustrated in FIG. 13.

FIG. 13 is a flowchart illustrating an example procedure of processing that can be performed by the processing apparatus according to the fifth exemplary embodiment. In the present exemplary embodiment, to realize the processing method illustrated in FIG. 13, the CPU 1211 illustrated in FIG. 8 executes the control program stored in the main memory 212 illustrated in FIG. 8. Further, it is presumed that each processing result of the following processing to be performed by the processing apparatus can be stored in the main memory 1212 illustrated in FIG. 8.

Processing to be performed in steps S600 to S660 illustrated in FIG. 13 is similar to the processing performed in steps S300 to S360 illustrated in FIG. 3 described in the fourth exemplary embodiment and, therefore, the description thereof is not repeated.

In step S670, the shape variation calculation unit 2020 illustrated in FIG. 12 performs processing for calculating a variation range of the estimated body surface shape, based on the deformation model generated in step S630 and the variation range of the deformation parameter vector calculated in step S660. An example method for calculating the variation range of the body surface shape is described below.

Figure 14:
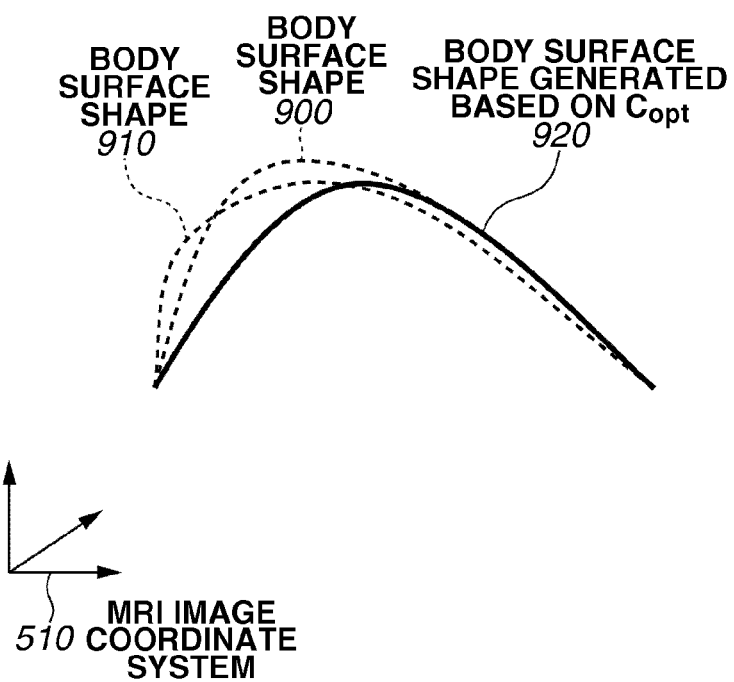
FIG. 14 schematically illustrates example processing to be performed in step S670 illustrated in FIG. 13, according to the fifth exemplary embodiment.

First, similar to the method described as a part of the processing to be performed in step S370 illustrated in FIG. 9 in the fourth exemplary embodiment, the shape variation calculation unit 2020 calculates a deformation state group (rUPPER_1 to rUPPER_M−1 and rLOWER_1 to rLOWER_M−1) of the subject. Subsequently, the shape variation calculation unit 2020 generates a surface that corresponds to the body surface of the subject for each state of the deformation state group. The above-described processing can be executed by performing warping processing on the position of the body surface of the subject extracted as a part of the processing to be performed in step S620, in the same manner as the warping processing performed on the region of interest in step S370 illustrated in FIG. 9 described in the first exemplary embodiment. FIG. 14 illustrates an example of the processing result.

FIG. 14 schematically illustrates the processing to be performed in step S670 illustrated in FIG. 13 according to the fifth exemplary embodiment.

In FIG. 14, a body surface shape 900 is a body surface shape of the subject generated based on, for example, deformation state of the subject rUPPER_1. Similarly, a body surface shape 910 is a body surface shape of the subject generated based on, for example, a deformation state of the subject rUPPER_2. As described above, the shape variation calculation unit 2020 calculates a body surface shape for each state of the deformation state group of the subject. Further, as illustrated by a body surface shape 920 generated based on the optimum deformation parameter vector "copt", the shape variation calculation unit 2020 can calculate a deformation state of the subject based on the optimum deformation parameter vector "copt" calculated in step S650. Then, the shape variation calculation unit 2020 can calculate the body surface of the subject based on the calculated deformation state of the subject. In the present exemplary embodiment, a plurality of body surfaces calculated according to the above-described method is referred to as "body surface shape group" and is designated as the variation range of the body surface shape.

In step S680, the shape variation image generation unit 2021 generates a shape variation image that includes a visually recognizable variation range of the body surface shape calculated in step S670 and performs processing for displaying the generated shape variation image on the monitor 1160. An example method for displaying the body surface shape is described in detail below.

More specifically, in the present step, the shape variation image generation unit 2021 generates an image including a group of overlapped body surface shapes calculated in step S670 and displays the generated image. In this case, for example, it is useful to employ an appropriate computer graphics rendering technique to generate a virtual image that can be observed from an arbitrary viewpoint position, as the body surface shape in the MRI image coordinate system 510 (i.e., the three-dimensional coordinate system). The image generation method is not limited to the above-described example. For example, another employable method can include virtually setting an arbitrary cross section in the MRI image coordinate system 510, obtaining a group of curves representing the position where the cross section intersects with the shape group, and drawing the obtained curves using the above-described rendering technique. Further, a more simplified method can include coinciding the cross section having been set with the image plane to be generated and generating an image including a group of curves drawn on the cross section. In this case, an image similar to that illustrated in FIG. 14, which illustrates the processing to be performed in step S670, can be generated.

Through the above-described processing, how the processing apparatus 1100-2 according to the present exemplary embodiment accurately estimates the deformation state of the subject can be presented to a user. For example, if the shape variation image generated by the shape variation image generation unit 2021 includes the group of body surface shapes that are mutually dispersive, the user can recognize that the deformation state of the subject has not been accurately estimated. On the other hand, if the body surface shapes included in the shape variation image are similar to each other, the user can recognize that the deformation state of the subject has been accurately estimated.

The exemplary embodiment of the present invention is not limited to the above-described example. For example, the shape variation image can emphasize the position where the variation of the body surface becomes larger, based on the group of body surface shapes of the subject calculated through the above-described processing. In this case, the position where the measurement of the body surface shape of the subject is necessary can be clearly presented to a user.

In step S690, the processing apparatus according to the present exemplary embodiment determines whether to add the shape measurement value relating to the body surface shape of the subject.

If it is determined to add the shape measurement value (YES in step S690), the operation returns to step S640.

On the other hand, if it is determined to add no shape measurement value (NO in step S690), the operation proceeds to step S700.

The determination processing in step S690 can be performed based on a user's (operator's) input operation via the mouse 1170 or the keyboard 1180. More specifically, the user visually recognizes the shape variation image displayed through the processing in step S680 and, if the user has known that the deformation state of the subject has not been accurately estimated, it is feasible to switch the processing in such a way as to additionally obtain body surface shape of the subject after the operation returns to step S640.

If the operation returns to step S640 as a result of the determination processing in step S690, then in step S640, the processing apparatus additionally obtains newly measured shape measurement value of the body surface shape of the subject, in addition to the already obtained shape measurement value of the body surface shape, and executes the following processing.

Processing to be performed in steps S700 to S740 illustrated in FIG. 13 is similar to the processing performed in steps S370 to S410 illustrated in FIG. 9 described in the fourth exemplary embodiment and, therefore, the description thereof is not repeated.

The processing apparatus 1100-2 according to the present exemplary embodiment completes the entire processing through the above-described sequential processes.

The above-described processing system according to the present exemplary embodiment can provide a mechanism capable of measuring the body surface shape of the subject that is required to calculate the deformation of the subject with a user's desired accuracy, in addition to the effects obtained by the processing system according to the fourth exemplary embodiment.

A processing apparatus according to a sixth exemplary embodiment of the present invention can provide a mechanism capable of presenting guidance information relating to the measurement of the body surface shape of a subject, which is necessary to accurately estimate the position of a region of interest of the subject in a face-up state, in addition to the mechanism of the processing apparatus according to the fifth exemplary embodiment. Thus, information necessary to efficiently measure the body surface shape of the subject can be presented to a user.

FIG. 15 schematically illustrates an example of a functional configuration of a processing system according to the sixth exemplary embodiment.

In FIG. 15, constituent components similar to those of the processing system according to the fifth exemplary embodiment illustrated in FIG. 12 are denoted by the same reference numerals and the descriptions thereof are not repeated.

As illustrated in FIG. 15, the processing apparatus 1100-3 according to the present exemplary embodiment is different from the processing apparatus 1100-2 according to the fifth exemplary embodiment illustrated in FIG. 12 in that a guidance information generation unit 2030 is provided instead of using the shape variation image generation unit 2021.

The guidance information generation unit 2030 can generate guidance information relating to the measurement of the body surface shape of the subject based on the variation range of the body surface shape calculated by the shape variation calculation unit 2020 and the variation range of the region of interest calculated by the region-of-interest variation calculation unit 2008. More specifically, the guidance information generated by the guidance information generation unit 2030 can be used to urge a user to measure the body surface shape of the subject.

Further, a hardware configuration of the processing system according to the present exemplary embodiment is similar to the hardware configuration of the processing system according to the fourth exemplary embodiment illustrated in FIG. 8 and, therefore, the description thereof is not repeated.

Next, an entire operation that can be performed by the processing apparatus 1100-3 according to the present exemplary embodiment is described in detail below with reference to a flowchart illustrated in FIG. 16.

FIG. 16 is a flowchart illustrating an example procedure of processing that can be performed by the processing apparatus according to the sixth exemplary embodiment. In the present exemplary embodiment, to realize the processing method illustrated in FIG. 16, the CPU 1211 illustrated in FIG. 8 executes a control program stored in the main memory 1212 illustrated in FIG. 8. Further, it is presumed that each processing result of the following processing to be performed by the processing apparatus can be stored in the main memory 1212 illustrated in FIG. 8.

Processing to be performed in steps S800 to S870 illustrated in FIG. 16 is similar to the processing performed in steps S600 to S670 illustrated in FIG. 13 described in the fifth exemplary embodiment, and, therefore, the description thereof is not repeated. Further, processing to be performed in step S880 illustrated in FIG. 16 is similar to the processing performed in step S370 illustrated in FIG. 9 described in the fourth exemplary embodiment, and, therefore, the description thereof is not repeated.

In step S890, the guidance information generation unit 2030 illustrated in FIG. 15 generates guidance information relating to the measurement of the body surface shape of the subject based on the variation range of the body surface shape calculated in step S870 and the variation range of the region of interest calculated in step S880, and performs processing for displaying the generated guidance information on the monitor 1160. More specifically, the guidance information presents a candidate position to additionally measure the body surface shape of the subject. An example method for displaying the guidance information is described in detail below.

First, the guidance information generation unit 2030 calculates a variation amount "gi" of the region of interest, using the following formula (11), for each element of the deformation parameter vector, with reference to the variation range of the region of interest calculated in step S880.

$$g_i \| p_{LOWER\_i} - p_{UPPER\_i} \| \qquad (11)$$

In the formula (11), "i" is a suffix allocated to each element of the deformation parameter vector and satisfies the relationship $1 \le i \le M$. The variation amount "gi" of the region of interest indicates the magnitude of an influence of the ambiguity in estimation of each element of the deformation parameter vector on the variation of the region of interest, as illustrated in FIGS. 17A and 17B.

FIGS. 17A and 17B schematically illustrate the processing to be performed in step S890 illustrated in FIG. 16, according to the sixth exemplary embodiment.

In FIG. 17A, a variation amount 930 is a positional variation amount g1 of the region of interest relating to a variation of the first element of the deformation parameter vector. Similarly, a variation amount 940 is a positional variation amount g2 of the region of interest relating to a variation of the second element of the deformation parameter vector. Hereinafter, to simplify the drawing, it is presumed that the total number of deformation parameter vectors is two.

Subsequently, the guidance information generation unit 2030 selects a variation amount having a largest value from the calculated M pieces of gi. According to the example illustrated in FIG. 17A, the variation amount g2 indicated by the variation amount 940 is larger than the variation amount g1 indicated by the variation amount 930. Therefore, the guidance information generation unit 2030 selects the second element of the deformation parameter vector. In other words, the element of the deformation parameter vector having a largest influence on the variation of the region of interest can be identified.

Subsequently, the guidance information generation unit 2030 selects a body surface shape of the subject based on the variation of the element value of the deformation parameter vector selected through the above-described processing, from the body surface shape group of the subject generated in step S870.

The illustration of FIG. 17A includes the body surface shape 900 of the subject calculated based on the variation of the first element of the deformation parameter vector and the body surface shape 910 of the subject calculated based on the variation of the second element of the deformation parameter vector.

According to the example illustrated in FIG. 17A, the element selected in the previous processing is the second element of the deformation parameter vector. Therefore, the shape selected in this case is the corresponding body surface shape 910.

The present processing step, for example, includes generating an image including the body surface shape 910 selected in the above-described processing and the body surface shape 920 generated based on the optimum deformation parameter vector "copt" that are overlapped with each other. The image generated in this step can be used as the guidance information. An example method for generating an image including the above-described overlapped shapes, for example, can be realized by processing similar to that of step S680 illustrated in FIG. 13 in the second exemplary embodiment. The guidance information generation unit 2030 displays the guidance information generated through the above-described processing on the monitor 1160.

FIG. 17B illustrates an example generation of the guidance information. As apparent from FIG. 17B, a large difference relative to the body surface shape 920 generated based on the optimum deformation parameter vector "copt" is visually recognizable at the position of an additional measurement candidate point 950 of the body surface shape 910. More specifically, it is understood that the variation amount of the element deformation parameter vector, which has been selected in the above-described processing, can be reduced in a case where a measurement value in the vicinity of the additional measurement candidate point 950 is added as a shape measurement value relating to the body surface shape of the subject obtained in step S840. Further, it is apparent that the variation amount of the region of interest can be also reduced in accordance with the reduction in the variation amount of the selected element of the deformation parameter vector. More specifically, a position of the body surface shape of the subject to be additionally measured can be presented to a user by displaying the guidance information.

processing to be performed in steps S900 to S940 illustrated in FIG. 16 is similar to the processing performed in step S690 illustrated in FIG. 13 described in the fifth exemplary embodiment and the processing performed in steps S380 to S410 illustrated in FIG. 9 described in the fourth exemplary embodiment, and, therefore, the description thereof is not repeated.

The processing apparatus 1100-3 according to the present exemplary embodiment completes the entire processing through the above-described sequential processes.

The above-described processing system according to the present exemplary embodiment can provide the following effects in addition to the effects obtained by the processing system according to the fifth exemplary embodiment (or the fourth exemplary embodiment). More specifically, for the purpose of accurately estimating the position of the region of interest, the processing system according to the present exemplary embodiment can efficiently present a user with information required to perform measurement of the body surface shape of the subject.

Further, the embodiment of the present invention includes a process which can be realized by executing the following processing.

The processing includes supplying a software program that can realize the functions of the above-described exemplary embodiment to a system or an apparatus via a network or an appropriate storage medium, and causing a computer (or a CPU or a micro-processing unit (MPU)) installed on the system or the apparatus to read the supplied program and execute predetermined processing based on the readout program.

The present invention encompass the above-described program and a computer readable recording medium that stores the program.

The processing apparatus according to the exemplary embodiment of the present invention can display an existence probability distribution of a corresponding region of a region of interest on a tomographic image when a user searches for the corresponding region on the tomographic image. Accordingly, the user can reduce the search range to efficiently search for the corresponding region, while appropriately considering the display information even when an actual error is large.

Further, in performing the matching between the first image and the second image captured by different modalities, the processing apparatus according to the exemplary embodiment of the present invention can present, in the second image, an existence range of a portion corresponding to the region of interest in the first image.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2012-006394 filed Jan. 16, 2012 and No. 2012-038719 filed Feb. 24, 2012, which are hereby incorporated by reference herein in their entirety.

What is claimed is:

1. An information processing apparatus comprising:
a region acquisition unit configured to obtain a specific region of a subject in a first three-dimensional coordinate system;
a tomographic image acquisition unit configured to obtain a tomographic image of the subject in a second three-dimensional coordinate system;
a distribution acquisition unit configured to obtain a probability distribution of the existence of the specific region in the tomographic image based on a positional error between the first three-dimensional coordinate system and the second three-dimensional coordinate system; and
a display control unit configured to cause a display unit to display a region indicating the probability distribution of the existence of the specific region in the obtained tomographic image.

2. The information processing apparatus according to claim 1,
wherein the display control unit is configured to cause the display unit to display the distribution on the tomographic image.

3. The information processing apparatus according to claim 2, further comprising a deformation estimation unit configured to estimate a deformation state of the subject caused between a capturing timing of three-dimensional image data and a capturing timing of the tomographic image based on surface shape data of the subject,
wherein the distribution acquisition unit is configured to obtain the distribution considering the deformation state.

4. The information processing apparatus according to claim 2, wherein the display control unit is configured to cause the distribution to be displayed via a change in line type.

5. The information processing apparatus according to claim 2, wherein the display control unit is configured to cause the distribution to be displayed via a change in color.

6. The information processing apparatus according to claim 1, wherein the display control unit is configured to cause a cross-sectional plane including the tomographic image for a three-dimensional region in which an existence probability of the region that corresponds to the specific region becomes a specific value to be displayed on the tomographic image.

7. The information processing apparatus according to claim 2, wherein the distribution acquisition unit is configured to obtain, as the distribution of probability, a minimum-volume region from three-dimensional regions in which an integrated value of the existence probability becomes a predetermined value.

8. An information processing method comprising:
obtaining a specific region of a subject in a first three-dimensional coordinate system;
obtaining a tomographic image of the subject in a second three-dimensional coordinate system;
processing to obtain a probability distribution of the existence of the specific region in the tomographic image based on a positional error between the first three-dimensional coordinate system and the second three-dimensional coordinate system; and
causing a display unit to display a region indicating the probability distribution of the existence of the specific region in the obtained tomographic image.

9. A non-transitory computer-readable storage medium storing a program that causes a computer to perform a method, the method comprising:
obtaining a region of interest of a subject in a first three-dimensional coordinate system;
obtaining a tomographic image of the subject in a second three-dimensional coordinate system;
processing to obtain a probability distribution of the existence of the specific region in the tomographic image based on a positional error between the first three-dimensional coordinate system and the second three-dimensional coordinate system; and
causing a display unit to display a region indicating the probability distribution of the existence of the specific region in the obtained tomographic image.

10. A processing apparatus comprising:
a first image acquisition unit configured to obtain a first image by causing a first imaging apparatus to capture an image of a subject whose orientation is in a first state;
a second image acquisition unit configured to obtain a second image by causing a second imaging apparatus to capture an image of the subject whose orientation is in a second state;
a region-of-interest acquisition unit configured to obtain a region of interest from the first image;
a deformation model generation unit configured to generate a deformation model with a parameter that expresses a deformation state of the subject when the subject is brought into the second state from the first state;
a shape measurement value acquisition unit configured to obtain a shape measurement value of the subject when the subject is in the second state;
a deformation parameter calculation unit configured to calculate a deformation parameter of the deformation model based on the deformation model and the shape measurement value;
a parameter variation range calculation unit configured to calculate a variation range of the deformation parameter based on the deformation model and the deformation parameter;
a region-of-interest variation calculation unit configured to calculate a variation range of the region of interest based on the region of interest obtained by the region-of-interest acquisition unit, the deformation model, and the variation range of the deformation parameter; and
an observation image generation unit configured to generate an observation image including the variation range of the region of interest presented on the second image.

11. The processing apparatus according to claim 10, further comprising:
a shape variation calculation unit configured to calculate a variation range of a body surface shape of the subject based on the deformation model and the variation range of the deformation parameter; and
a shape variation image generation unit configured to generate a shape variation image based on the variation range of the body surface shape of the subject.

12. The processing apparatus according to claim 10, further comprising:
a shape variation calculation unit configured to calculate a variation range of a body surface shape of the subject based on the deformation model and the variation range of the deformation parameter; and
a guidance information generation unit configured to generate guidance information relating to measurement of the body surface shape of the subject based on the variation range of the body surface shape of the subject and the variation range of the region of interest.

13. The processing apparatus according to claim 10, wherein the shape measurement value acquisition unit is configured to obtain, as the shape measurement value, a shape measurement value relating to a body surface shape of the subject when the subject is in the second state.

14. A processing method comprising:
   obtaining a first image by causing a first imaging apparatus to capture an image of a subject whose orientation is in a first state;
   obtaining a second image by causing a second imaging apparatus to capture an image of the subject whose orientation is in a second state;
   obtaining a region of interest from the first image;
   generating a deformation model with a parameter that expresses a deformation state of the subject caused when the subject is brought into the second state from the first state;
   obtaining a shape measurement value of the subject in the second state of the subject;
   calculating a deformation parameter of the deformation model based on the deformation model and the shape measurement value;
   calculating a variation range of the deformation parameter based on the deformation model and the deformation parameter;
   calculating a variation range of the region of interest based on the obtained region of interest, the deformation model, and the variation range of the deformation parameter; and
   generating an observation image including the variation range of the region of interest presented on the second image.

15. A non-transitory computer-readable storage medium storing a program that causes a computer to perform a method, the method comprising:
   obtaining a first image by causing a first imaging apparatus to capture an image of a subject whose orientation is in a first state;
   obtaining a second image by causing a second imaging apparatus to capture an image of the subject whose orientation is in a second state;
   obtaining a region of interest from the first image;
   generating a deformation model with a parameter that expresses a deformation state of the subject caused when the subject is brought into the second state from the first state;
   obtaining a shape measurement value of the subject in the second state of the subject;
   calculating a deformation parameter of the deformation model based on the deformation model and the shape measurement value;
   calculating a variation range of the deformation parameter based on the deformation model and the deformation parameter;
   calculating a variation range of the region of interest based on the obtained region of interest, the deformation model, and variation range of the deformation parameter; and
   generating an observation image including the variation range of the region of interest presented on the second image.

16. A processing apparatus comprising:
   a first image acquisition unit configured to obtain a first image by causing a first imaging apparatus to capture an image of a subject in a first state;
   a second image acquisition unit configured to obtain a second image by causing a second imaging apparatus to capture an image of the subject in a second state;
   a region-of-interest acquisition unit configured to obtain a region of interest from the first image;
   a deformation model generation unit configured to generate a deformation model that expresses a deformation state and its variation of the subject when the subject is brought into the second state from the first state;
   a region-of-interest variation calculation unit configured to calculate a variation range of the region of interest based on the region of interest obtained by the region-of-interest acquisition unit, and the deformation model; and
   an observation image generation unit configured to generate an observation image including the variation range of the region of interest presented on the second image.

17. The information processing apparatus according to claim 1, wherein the region acquisition unit includes an ultrasonic probe, and
   wherein the positional error is based on a position and orientation of the ultrasonic probe measured by a sensor.

18. The information processing apparatus according to claim 1, wherein the display control unit causes the display unit to display concentric circles indicating the probability distribution of the existence of the specific region in the tomographic image.

19. The information processing apparatus according to claim 1, wherein the positional error is based on a deformation state of the subject.

20. The information processing apparatus according to claim 1, wherein the probability distribution is indicative that an actual corresponding lesion exists in a sphere whose center is positioned at the position of the specific region.

21. The information processing apparatus according to claim 20, wherein a radius of the sphere is a distance from the center which is calculated as an integrated value of a normal distribution function in the sphere.

* * * * *